US012353926B1

(12) United States Patent
Haider et al.

(10) Patent No.: US 12,353,926 B1
(45) Date of Patent: Jul. 8, 2025

(54) NETWORKED PORTAL FOR MULTIDIRECTIONAL INTEGRATION OF DIVERSE UNAFFILIATED PROCESSES AND SUBSYSTEMS WITH CLIENT APPLICATIONS

(71) Applicant: Wells Fargo Bank, N.A., San Francisco, CA (US)

(72) Inventors: Imran Haider, San Ramon, CA (US); Ranganathan Kanchi, Danville, CA (US); Jonathan Hartsell, Mooresville, NC (US); Daniel Sanford, Charlotte, NC (US); Ramesh N. Tejavath, San Francisco, CA (US); Nathan C. Freeling, Lafayette, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 6 days.

(21) Appl. No.: 17/561,226

(22) Filed: Dec. 23, 2021

(51) Int. Cl.
*G06F 9/54* (2006.01)
*H04L 67/60* (2022.01)

(52) U.S. Cl.
CPC .............. *G06F 9/541* (2013.01); *H04L 67/60* (2022.05)

(58) Field of Classification Search
None
See application file for complete search history.

(56) References Cited

U.S. PATENT DOCUMENTS

| | | | |
|---|---|---|---|
| 11,106,515 B1* | 8/2021 | Fakhraie | G06Q 20/4014 |
| 2007/0043732 A1* | 2/2007 | Schleimer | G06F 16/252 |
| 2014/0223448 A1* | 8/2014 | Varoglu | G06F 9/543 |
| | | | 719/313 |
| 2018/0276053 A1* | 9/2018 | Kesavan | G06F 9/541 |
| 2021/0184853 A1* | 6/2021 | Crowson | H04L 67/53 |

* cited by examiner

*Primary Examiner* — Chat C Do
*Assistant Examiner* — William C Wood
(74) *Attorney, Agent, or Firm* — Foley & Lardner LLP

(57) ABSTRACT

This disclosure is directed to integrating unaffiliated applications, or the processes and/or subsystems (e.g., application interfaces) of unaffiliated applications, with client applications to enable the client applications to provide new capabilities not otherwise available through the client application. The disclosed approach allows users to access new functionality within the operating environment of the client application, without accessing unaffiliated applications and undergoing separate authentication and data exchange with each unaffiliated application. Functionality of an unaffiliated application can be integrated by, for example, incorporating such processes and subsystems as interactive user interfaces, widgets, applets, plugins, etc., of unaffiliated applications.

18 Claims, 14 Drawing Sheets

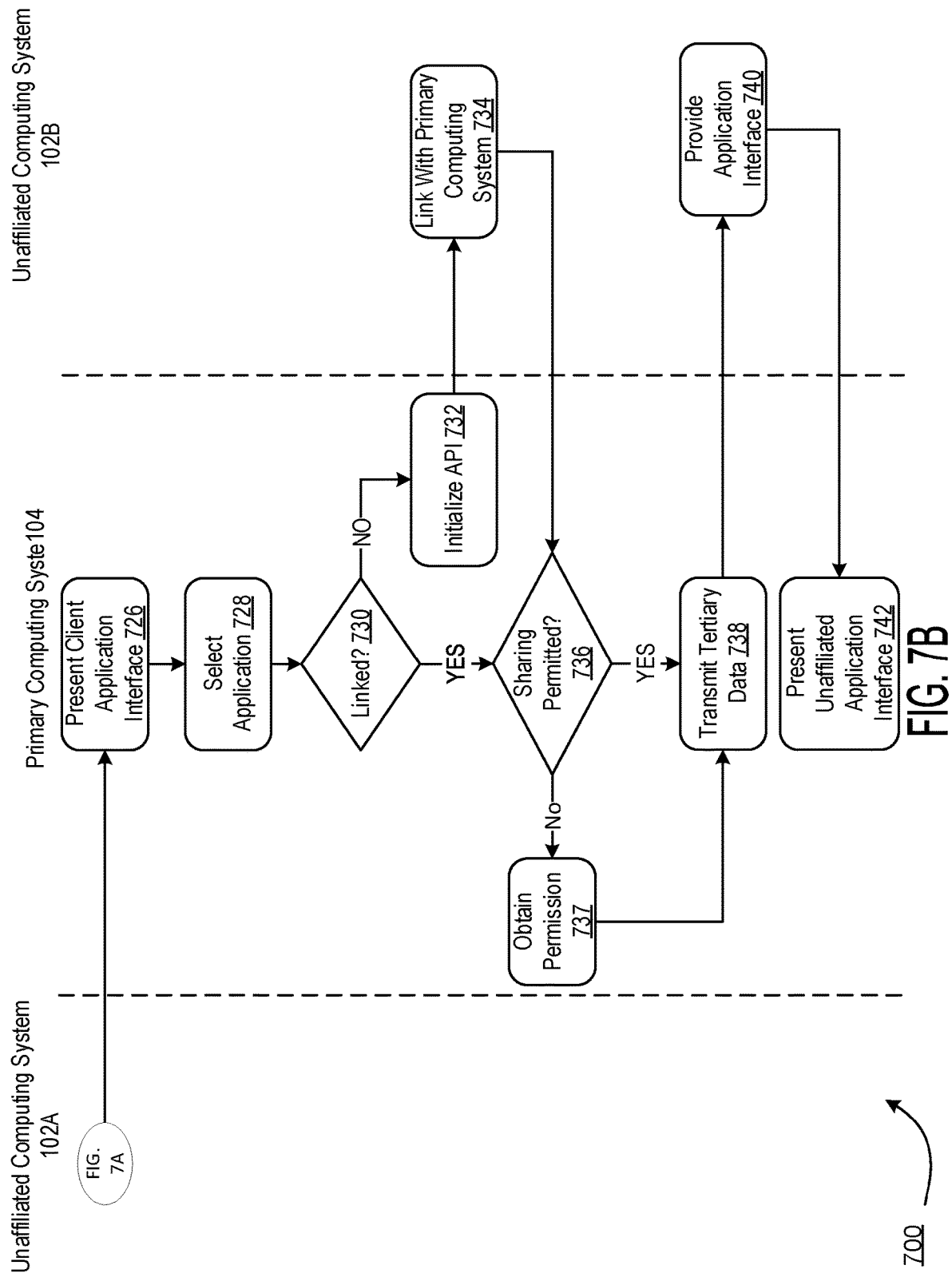

NETWORKED PORTAL FOR MULTIDIRECTIONAL INTEGRATION OF DIVERSE UNAFFILIATED PROCESSES AND SUBSYSTEMS WITH CLIENT APPLICATIONS

BACKGROUND

Client applications and unaffiliated applications of unaffiliated third-parties, as well as their associated computing systems, engage in computationally redundant tasks to configure and provide various functionality through the client applications and the unaffiliated applications. For example, a primary computing system, client application, unaffiliated computing system, and unaffiliated application can separately execute nearly identical, and thus wasteful, processes to provide various application interfaces in multiple applications.

SUMMARY OF THE INVENTION

In one aspect, this disclosure is directed to a method. The method may comprise: presenting, by a primary computing system, in a client application that provides access to a user account that is associated with a user and that comprises primary data corresponding to the user, a listing of one or more unaffiliated applications administered by respective unaffiliated computing systems; detecting, by the primary computing system, via the client application, a selection of an unaffiliated application for integration with the client application; identifying, by the primary computing system, a subset of the primary data that relates to the selected unaffiliated application based on functionality provided by the unaffiliated application; transmitting, by the primary computing system, via an application programming interface (API) to an unaffiliated computing system corresponding to the selected unaffiliated application, the identified subset of the primary data; receiving, by the primary computing system, from the unaffiliated computing system via the API, an unaffiliated application interface that is generated based on the subset of the primary data; and presenting, by the primary computing system, the unaffiliated application interface in the client application, wherein the client application presents the unaffiliated application interface without requiring the user to provide the subset of the primary data to the unaffiliated application.

In various embodiments, the method may comprise receiving, by the primary computing system, from the unaffiliated computing system, executable code corresponding to the unaffiliated application interface for presentation via the client application. Presenting the unaffiliated application interface may comprise transmitting the executable code to the client application running on a user device for execution in presenting the unaffiliated application interface, wherein the unaffiliated application interface provides interactivity with the primary data and/or data based on an analysis or a processing of the primary data. The method may comprise: generating, by the primary computing system, an API request identifying the client application and the unaffiliated application; and transmitting, by the primary computing system, the API request via the API to the unaffiliated computing system corresponding to the unaffiliated application. The unaffiliated application may be a first unaffiliated application, the selection may be a first selection, and the method may comprise detecting, by the primary computing system, via the client application, a second selection of a second unaffiliated application for integration with the client application. The method may comprise receiving, by the primary computing system, from the unaffiliated computing system via the API, tertiary data relating to the account or to the user associated with the account. The unaffiliated application may be a first unaffiliated application, the unaffiliated computing system may be a first unaffiliated computing system, the API may be a first API, the subset of the primary data may be a first subset of the primary data, and the method may comprise: identifying, by the primary computing system, a second subset of the primary data related to a second unaffiliated application; and transmitting, by the primary computing system via a second API, the second subset of the primary data and the tertiary data to a second unaffiliated computing system corresponding to the second unaffiliated application. The unaffiliated application interface may be a first unaffiliated application interface, and the method may comprise: receiving, by the primary computing system, a second unaffiliated application interface that is based on the second subset of primary data and the tertiary data; and presenting, by the primary computing system, via the client application, the second unaffiliated application interface, wherein the client application presents the second unaffiliated application interface without requiring the user to provide the second subset of the primary data or the tertiary data to the second unaffiliated application. The tertiary data may be a first set of tertiary data, and the method may comprise: receiving, by the primary computing system, from the second unaffiliated computing system via the second API, a second set of tertiary data related to the at least one of the account, the user, or the first set of tertiary data; and transmitting, by the primary computing system via the second API, the second set of tertiary data to the first unaffiliated computing system. The method may comprise receiving, by the primary computing system from the first unaffiliated computing system, an updated application interface for presentation in the client application, the updated application interface being based on (i) the first subset of the primary data, (ii) the first set of tertiary data, and (iii) the second set of tertiary data, wherein the client application presents the updated application interface without requiring the user to provide, to the first unaffiliated computing system or to the first unaffiliated application, (i) the first subset of the primary data, (ii) the first set of tertiary data, and (iii) the second set of tertiary data.

In another aspect, this disclosure is related to a system. The system may comprise one or more processors coupled to memory, the one or more processors configured to: present, in a client application that provides access to a user account that is associated with a user and that comprises primary data corresponding to the user, a listing of one or more unaffiliated applications administered by respective unaffiliated computing systems; detect, via the client application, a selection of an unaffiliated application for integration with the client application; identify a subset of the primary data that relates to the selected unaffiliated application based on functionality provided by the unaffiliated application; transmit, via an application programming interface (API) to an unaffiliated computing system corresponding to the selected unaffiliated application, the identified subset of the primary data; receive, from the unaffiliated computing system via the API, an unaffiliated application interface that is generated based on the subset of the primary data; and present the unaffiliated application interface in the client application, wherein the client application presents the unaffiliated application interface without requiring the user to provide that is based on the subset of the primary data without requiring the user to provide the subset of the primary data to the unaffiliated application or the unaffiliated computing system.

In various embodiments, the one or more processors may be configured to receive, from the unaffiliated computing system via the API, executable code corresponding to the unaffiliated application interface for presentation via the client application. Presenting the unaffiliated application interface may comprise transmitting the executable code to the client application running on a user device for execution in presenting the unaffiliated application interface, wherein the unaffiliated application interface provides interactivity with the primary data and/or data based on an analysis or a processing of the primary data. The one or more processors may be configured to: generate an API request identifying the client application and the unaffiliated application; and transmit the API request via the API to the unaffiliated computing system corresponding to the unaffiliated application. The unaffiliated application may be a first unaffiliated application, the selection may be a first selection, and the one or more processors may be configured to detect, via the client application, a second selection of a second unaffiliated application for integration with the client application. The one or more processors may be configured to receive, from the unaffiliated computing system via the API, tertiary data relating to the account or to the user associated with the account. The unaffiliated application may be a first unaffiliated application, the unaffiliated computing system may be a first unaffiliated computing system, the API may be a first API, the subset of the primary data may be a first subset of the primary data, and the one or more processors may be configured to: identify a second subset of the primary data related to a second unaffiliated application; and transmit, via a second API, the second subset of the primary data and the tertiary data to a second unaffiliated computing system corresponding to the second unaffiliated application. The unaffiliated application may be a first unaffiliated application, and the one or more processors may be configured to: receive, a second unaffiliated application interface that is based on the second subset of the primary data and the tertiary data; and present, via the client application, the second unaffiliated application interface, wherein the client application presents the second unaffiliated application interface without requiring the user to provide the second subset of the primary data or the tertiary data to the second unaffiliated application interface. The tertiary data may be a first set of tertiary data and the one or more processors may be configured to: receive, from the second unaffiliated computing system via the second API, a second set of tertiary data related to at least one of the account, the user, or the first set of tertiary data; and transmit, via the second API, the second set of tertiary data to the first unaffiliated computing system. The one or more processors may be configured to receive, from the first unaffiliated computing system, an updated application interface for presentation in the client application, the updated application interface being based on (i) the first subset of the primary data, (ii) the first set of tertiary data, and (iii) the second set of tertiary data, wherein the client application presents the updated application interface without requiring the user to provide, to the first unaffiliated computing system or to the first unaffiliated application, (i) the first subset of the primary data, (ii) the first set of tertiary data, and (iii) the second set of tertiary data.

In yet another aspect, this disclosure is related to a method implemented by a user computing device comprising one or more processors and a memory having instructions executable by the one or more processors to run a client application. The method may comprise: presenting, by the client application running on the user computing device, a listing of a plurality of unaffiliated applications administered by respective unaffiliated computing systems, the client application being configured to provide a user, once the user is authenticated, access to a user account that is associated with the user and that comprises primary user data corresponding to the user; detecting, by the client application, via an input device of the user computing device, a selection of an unaffiliated application in the listing for integration with the client application; transmitting, directly or via a primary computing system, using an application programming interface (API), a subset of the primary data to an unaffiliated computing system corresponding to the selected unaffiliated application; receiving, by the client application, from the primary computing system or from the unaffiliated computing system, via the API, an unaffiliated application interface that is generated, by the unaffiliated computing system, based on the subset of the primary data; and presenting, by the client application, the unaffiliated application interface without requiring the user to provide the subset of the primary data to the unaffiliated application.

In various embodiments, the unaffiliated application interface may provide interactivity with the primary data and/or data based on an analysis or a processing of the primary data. The method may comprise receiving, by the client application, from the primary computing system, executable code corresponding to the unaffiliated application interface for presentation via the client application. The executable code may be received by the primary computing system from the unaffiliated computing system. The unaffiliated application may be a first unaffiliated application, the selection may be a first selection, and the method may comprise detecting, by the client application, via the input device of the user computing device, a second selection of a second unaffiliated application for integration with the client application. The unaffiliated application interface may be a first unaffiliated application interface, and the method may comprise presenting, by the client application, a second unaffiliated application interface corresponding to the second unaffiliated application following the second selection. The primary computing system or the client application may have received, from the first unaffiliated computing system via the first API, tertiary data relating to the account or to the user associated with the account. The unaffiliated computing system may be a first unaffiliated computing system, the subset of the primary data may be a first subset of the primary data, the API may be a first API, and the method may comprise: identifying, by at least one of the primary computing system or the client application, a second subset of the primary data related to the second unaffiliated application; and transmitting, by at least one of the primary computing system or the client application, via a second API, the second subset of the primary data and the tertiary data to a second unaffiliated computing system corresponding to the second unaffiliated application. The client application may present the second unaffiliated application interface without requiring the user to provide the second subset of the primary data or the tertiary data to the second unaffiliated application. The tertiary data may be a first set of tertiary data, and the method may comprise: receiving, by at least one of the primary computing system or the client application, from the second unaffiliated computing system via the second API, a second set of tertiary data related to the at least one of the account, the user, or the first set of tertiary data; and transmitting, by at least one of the primary computing system or the client application, via the second API, the second set of tertiary data to the first unaffiliated computing system. The method may further comprise receiving, by at least one of the primary computing system or the client application, from the first unaffiliated computing system, an updated application interface for presentation in the client application, the updated application interface being based on (i) the first subset of the primary data, (ii) the first set of tertiary data, and (iii) the second set of tertiary data. The client application may present the updated application interface without the user being required to provide, to the first unaffiliated computing system or to the first unaffiliated application, any of (i) the first subset of the primary data, (ii) the first set of tertiary data, or (iii) the second set of tertiary data.

In yet another aspect, this disclosure is related to a user computing device comprising one or more processors and a memory having instructions executable by the one or more processors to run a client application. The client application may be configured to: present a listing of a plurality of unaffiliated applications administered by respective unaffiliated computing systems, the client application being configured to provide a user, once the user is authenticated, access to a user account that is associated with the user and that comprises primary user data corresponding to the user; detect, via an input device of the user computing device, a selection of an unaffiliated application in the listing for integration with the client application; transmit, directly or via a primary computing system, using an application programming interface (API), a subset of the primary data to an unaffiliated computing system corresponding to the selected unaffiliated application; receive, from the primary computing system or from the unaffiliated computing system, via the API, an unaffiliated application interface that is generated, by the unaffiliated computing system, based on the subset of the primary data; and present the unaffiliated application interface without requiring the user to provide the subset of the primary data to the unaffiliated application.

In various embodiments, the unaffiliated application interface may provide interactivity with the primary data and/or data based on an analysis or a processing of the primary data. The client application may be configured to receive, from the primary computing system, executable code corresponding to the unaffiliated application interface for presentation via user interfaces of the user computing device. The executable code may have been received by the primary computing system from the unaffiliated computing system. The unaffiliated application may be a first unaffiliated application, wherein the selection may be a first selection, and the client application may be configured to detect, via the input device of the user computing device, a second selection of a second unaffiliated application for integration with the client application. The unaffiliated application interface may be a first unaffiliated application interface, and the client application may be configured to present, a second unaffiliated application interface corresponding to the second unaffiliated application following the second selection. The primary computing system or the client application may have received, from the first unaffiliated computing system via the first API, tertiary data relating to the account or to the user associated with the account, the unaffiliated computing system may be a first unaffiliated computing system, the subset of the primary data may be a first subset of the primary data, the API may be a first API, and the client application may be configured to: identify a second subset of the primary data related to the second unaffiliated application; and transmit, via a second API, the second subset of the primary data and the tertiary data to a second unaffiliated computing system corresponding to the second unaffiliated application, wherein the client application presents the second unaffiliated application interface without requiring the user to provide the second subset of the primary data or the tertiary data to the second unaffiliated application. The tertiary data may be a first set of tertiary data, and the client application may be configured to: receive, from the second unaffiliated computing system via the second API, a second set of tertiary data related to the at least one of the account, the user, or the first set of tertiary data; transmit, via the second API, the second set of tertiary data to the first unaffiliated computing system; and receive, from the first unaffiliated computing system, an updated application interface for presentation in the client application, the updated application interface being based on (i) the first subset of the primary data, (ii) the first set of tertiary data, and (iii) the second set of tertiary data, wherein the client application presents the updated application interface without requiring the user to provide, to the first unaffiliated computing system or to the first unaffiliated application, any of (i) the first subset of the primary data, (ii) the first set of tertiary data, or (iii) the second set of tertiary data.

In yet another aspect, this disclosure is directed to a method implemented by an unaffiliated computing system that comprises one or more processors and that communicates, via an internet communications network, with an unaffiliated application executing on a plurality of user devices. The method may comprise: receiving, by the one or more processors via an application programming interface (API), from at least one of a primary computing system or a client application with which the primary computing system communicates when the client application is executing on a user computing device, a subset of primary data that corresponds to a user account of a user, wherein the user account is administered by the primary computing system and is accessible via the client application, wherein the primary computing system transmits the subset of the primary to the unaffiliated computing system in response to selection, via the client application executing on the user computing device, of the unaffiliated application from among a plurality of unaffiliated applications administered by respective unaffiliated computing systems; generating, by the one or more processors, tertiary data that applies functionality of the unaffiliated application to the subset of the primary data; and transmitting, by the one or more processors via the API, to at least one of the primary computing system or the client application executing on the user computing device, (i) the tertiary data, and (ii) an unaffiliated application interface for presentation in the client application, wherein the client application executing on the user computing device presents the unaffiliated application interface and the tertiary data without the unaffiliated application or the unaffiliated computing system receiving the subset of the primary data from the user computing device.

In various embodiments, the client application does not provide the functionality provided by the unaffiliated application. The subset of the primary data received by the unaffiliated computing system may have been selected for transmission to the unaffiliated computing system based on the functionality provided by the unaffiliated application. The tertiary data may relate to at least one of the user account or the user associated with the user account. The user computing device may not be one of the plurality of user devices executing the unaffiliated application such that the user computing device executes the client application but does not execute the unaffiliated application. Transmitting the unaffiliated application interface may comprise transmitting, by the one or more processors, to the primary computing system, executable code corresponding to the unaffiliated application interface for execution by at least one of the primary computing system or the client application. Transmitting the unaffiliated application interface may comprises transmitting, by the one or more processors, to the client application executing on the user computing device, executable code corresponding to the unaffiliated application interface for execution by the client application. The unaffiliated application interface may provide interactivity that enables selections for viewing different analyses based on at least one of the primary data or the tertiary data. The tertiary data may be based on an analysis or a processing of the primary data. The method may comprise receiving, by the one or more processors, from the primary computing system, an API request identifying the client application and the unaffiliated application before transmitting the unaffiliated application interface to at least one of the primary computing system or the client application executing on the user computing device. The subset of the primary data may be a first subset of the primary data, the tertiary data may be a first set of tertiary data, and the method may comprise: receiving, by the one or more processors via the API, from at least one of the primary computing system or the client application executing on the user computing device, a second subset of the primary data; generating, by the one or more processors, a second set of tertiary data that is based on the second subset of the primary data; and transmitting, by the one or more processors via the API, the second set of tertiary data to at least one of the primary computing system or the client application executing the user computing device for presentation with the unaffiliated application interface executing in the client application. The unaffiliated application interface may be a first unaffiliated application interface, and the method may comprise transmitting, by the one or more processors via the API, an updated application interface for presentation in the client application, the updated application interface being based on (i) the subset of the primary data, (ii) the first set of tertiary data, and (iii) the second set of tertiary data, wherein the client application presents the updated application interface without requiring the user to provide (i) the subset of the primary data, (ii) the first set of tertiary data, or (iii) the second set of tertiary data to the unaffiliated computing system or to the unaffiliated application. Each of the plurality of user devices may execute on a corresponding user device for access to a corresponding unaffiliated user account administered by the unaffiliated computing system.

In yet another aspect, this disclosure is directed to an unaffiliated computing system that comprises one or more processors and that communicates, via an internet communications network, with an unaffiliated application executing on a plurality of user devices. The one or more processors may be configured to: receive, via an application programming interface (API), from at least one of a primary computing system or a client application with which the primary computing system communicates when the client application is executing on a user computing device, a subset of primary data that corresponds to a user account of a user, wherein the user account is administered by the primary computing system and is accessible via the client application, wherein the primary computing system transmits the subset of the primary to the unaffiliated computing system in response to selection, via the client application executing on the user computing device, of the unaffiliated application from among a plurality of unaffiliated applications administered by respective unaffiliated computing systems; generate tertiary data that applies functionality of the unaffiliated application to the subset of the primary data; and transmit, via the API, to at least one of the primary computing system or the client application executing on the user computing device, (i) the tertiary data, and (ii) an unaffiliated application interface for presentation in the client application, wherein the client application executing on the user computing device presents the unaffiliated application interface and the tertiary data without the unaffiliated application or the unaffiliated computing system receiving the subset of the primary data from the user computing device.

In various embodiments, the client application does not provide the functionality provided by the unaffiliated application. Transmitting the unaffiliated application interface may comprise transmitting, to the primary computing system, executable code corresponding to the unaffiliated application interface for execution by at least one of the primary computing system or the client application. Transmitting the unaffiliated application interface may comprise transmitting, to the client application executing on the user computing device, executable code corresponding to the unaffiliated application interface for execution by the client application. The one or more processors may be configured to receive, from the primary computing system, an API request identifying the client application and the unaffiliated application before transmitting the unaffiliated application interface to at least one of the primary computing system or the client application executing on the user computing device. The subset of the primary data may be a first subset of the primary data, the tertiary data may be a first set of tertiary data, and the one or more processors may be configured to: receive, via the API, from at least one of the primary computing system or the client application executing on the user computing device, a second subset of the primary data; generating a second set of tertiary data that is based on the second subset of the primary data; and transmitting, via the API, the second set of tertiary data to at least one of the primary computing system or the client application executing the user computing device for presentation with the unaffiliated application interface executing in the client application. The unaffiliated application interface may be a first unaffiliated application interface, and the one or processors may be configured to transmit, via the API, an updated application interface for presentation in the client application, the updated application interface being based on (i) the subset of the primary data, (ii) the first set of tertiary data, and (iii) the second set of tertiary data.

BRIEF DESCRIPTION OF THE DRAWINGS

FIGS. 7A and 7B provide a flow diagram of an example method for bidirectional integration of diverse unaffiliated processes and subsystems, according to various potential example implementations.

DETAILED DESCRIPTION

Figure 1:
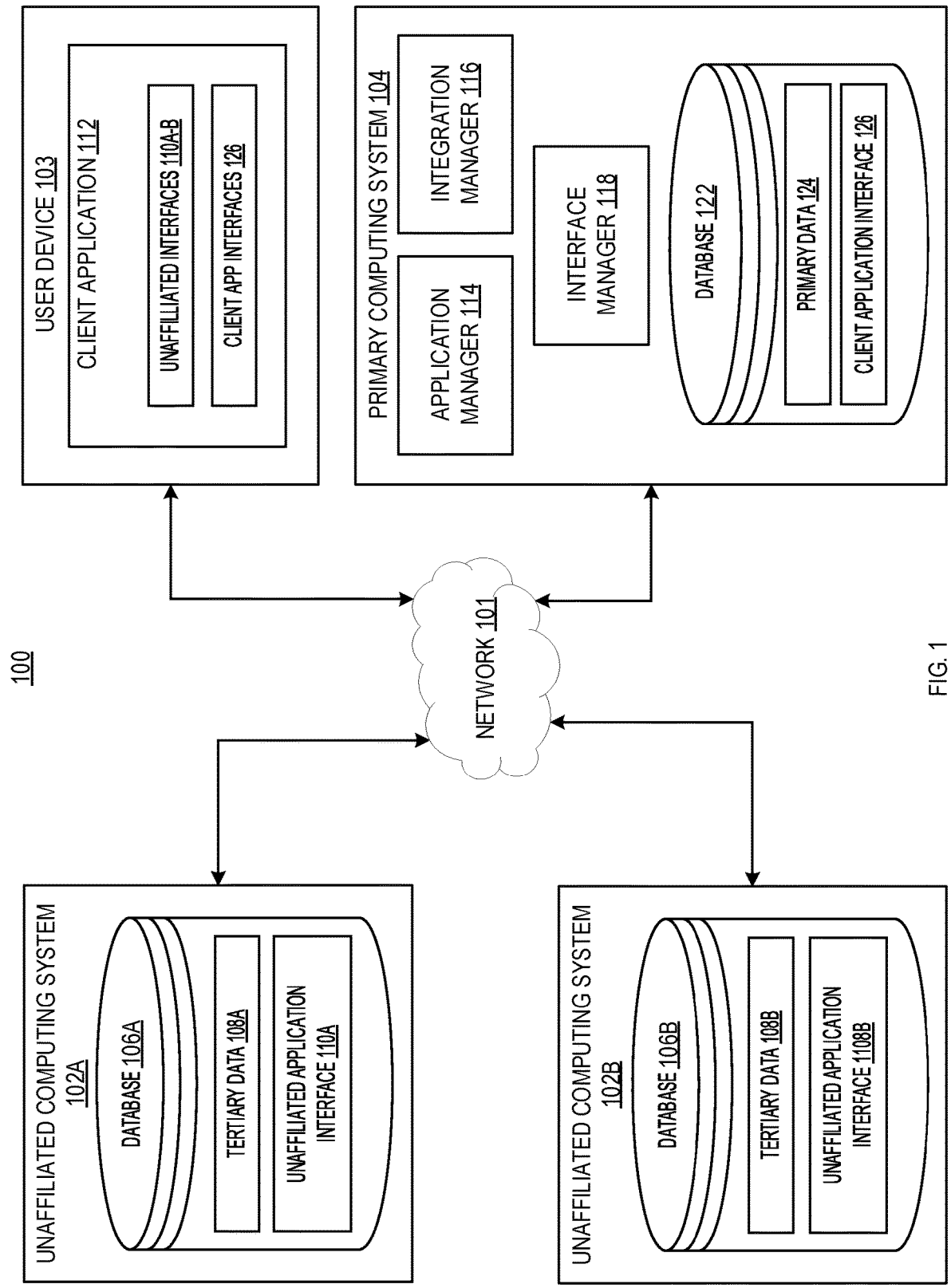
FIG. 1 is a block diagram of an example system enabling multidirectional integration of diverse unaffiliated processes and subsystems, according to various potential example implementations.

This disclosure is directed to integrating unaffiliated applications, or the interfaces or functionalities thereof (e.g., processes and/or subsystems of unaffiliated applications), with a client application to enable the client application to provide new capabilities not otherwise available through the client application. The disclosed approach allows users to access new interfaces and/or functionality within the operating environment of the client application, without accessing unaffiliated applications and undergoing separate authentication with each unaffiliated application, and separately and redundantly providing each unaffiliated application particular data.

In various implementations, a client application of an enterprise may provide users access to various account data and functionality concerning accounts at that enterprise. Meanwhile, certain unaffiliated applications may provide various other functionality and services, which could rely on the user's account data, such as analyzing device or network usage, user activities, automated enterprise time tracking, or providing other data analytics. To obtain those services, users download and launch the unaffiliated applications and provide the unaffiliated applications the account data (and/or access to the account) needed by the unaffiliated applications to provide the functionality and services. This is cumbersome and computationally inefficient, especially as the number of such unaffiliated applications grows and users otherwise need to download, run, register with, and provide the data (that is already available to another application, system, and/or subsystem, such as the client application) to each unaffiliated application to benefit from those unaffiliated applications.

The present disclosure includes example implementations that integrate certain functionality of unaffiliated applications through, for example, a two-way data exchange between the client application and unaffiliated applications (e.g., via application programming interface (API) connections between a primary computing system and unaffiliated computing systems of the third-parties). In various embodiments, a client application integrates with unaffiliated applications in a multidirectional data sharing arrangement that allows unaffiliated applications to receive, for example, account data to be analyzed (e.g., primary data from a primary computing system or tertiary data received from other unaffiliated computing systems), and allows the client application to present results of various analyses and interactivity with the results. The client application can provide users with all, or a subset of all, the functionality of each unaffiliated application, and/or functionality or features custom-tailored for or otherwise suited to all (or certain subsets of all) users of the client application, and/or functionality or features that are otherwise not available through another independent application. In certain embodiments, certain functionality can be provided in a real-time link between the client application and an unaffiliated application, allowing the user to interface with certain components of the unaffiliated application via the client application (e.g., in various frames of the client application, such as inline frames) as data is exchanged between the client application and the unaffiliated application (directly and/or via the primary computing system and/or an unaffiliated computing system). In various embodiments, the client application may execute particular code that enables the client application to provide particular functionality using, for example, data that is exchanged with the unaffiliated application and/or the unaffiliated computing system. In various implementations, functionality of a unaffiliated application can be integrated by, for example, incorporating processes and/or subsystems of unaffiliated applications and unaffiliated computing systems, such as user interfaces, widgets, applets, plugins, etc. The client application can serve as a dynamic platform that allows users to select sets of unaffiliated applications (and/or particular interfaces and/or functionality that is otherwise only available through unaffiliated applications) and expand the capabilities and usefulness of the client application in a more computationally efficient manner (reducing, e.g., processing and memory requirements otherwise required to execute and manage multiple applications and the processes thereof that are redundant or superfluous with respect to each other and/or with respect to the client application).

In various implementations, the client application allows users to select a set of one or more unaffiliated applications, and the client applications can provide the user, without leaving the client application, the ability to share account data with the unaffiliated applications and obtain analytics or other features that would otherwise require the user to separately access (and provide login credentials for authentication to) each unaffiliated application.

In an example use case, a user may access a client application, and separately use multiple unaffiliated applications, to manage an enterprise and the various specialized technological needs thereof. Each application may require certain information about the enterprise and its operations to meet those needs, information that is available to the client application but not otherwise available to the unaffiliated applications. Moreover, the client application may be better equipped to provide its own functionality if the client application were able to access various information (e.g., analyses of account data) generated by, or otherwise available to, the various unaffiliated applications. However, it would be cumbersome and inefficient for the user to first manually provide information about the enterprise to the unaffiliated application for analysis, and then provide the result of the analysis to the client application and/or to other unaffiliated applications so the client application can serve its intended purpose.

The implementations described herein can also enable the user to allow the applications to access the client application to retrieve information for a certain purpose, and then allow the client application to receive certain other information (e.g., an analysis of the information received from the client application) from the application to enable the client application to function properly. This solution can enhance user experience by providing a technological link between otherwise independent applications and computing systems.

Additional benefits of the disclosed approach include providing third-party application developers efficient access to the user base of the client application, and enabling the client application to provide additional functionality or other features and enhancements (which may or may not otherwise be available through third-party applications) without having to develop such features "in house" and update the client application to newer versions that include the enhancements.

In various implementations, a client application can provide, via one or more unaffiliated computing systems, functionality or features that are not available through third-party applications (at least not available through applications that are in communication or otherwise associated with the unaffiliated computing systems or the third-parties associated the unaffiliated computing systems), but instead are being provided by third-parties (via unaffiliated computing systems) through the client application. A primary computing system and/or a client application may interface (e.g., via one or more APIs) with unaffiliated computing systems as needed to obtain executable code and/or data to provide new capabilities from within the client application. The new capabilities may utilize (e.g., analyze or otherwise process) data that is provided by or otherwise available to the primary computing system and/or the client application. This enables third-party developers to provide certain features, enhancements, capabilities, functionalities, processes, or subsystems to users of the client application without having to develop their own separate applications (and seeking users for the separate applications to establish their own user bases). The client application may serve as a platform that allows users to access and use "mini," "sub," "secondary," and/or "accompanying" applications (e.g., applets, widgets, interactive user interfaces, plugins, etc.) within a main client application. The third-party developers can thus develop interfaces, functionalities, enhancements, and/or features within the operating environment of (and subject to the authentication protocols of) the client application rather than newly develop independent applications.

As used herein, "unaffiliated computing systems" are distinct computing systems of separate enterprises and/or institutions that have independent security protocols (e.g., for user authentication). Similarly, "unaffiliated applications" are distinct applications that run independently of each other and have separate authentication requirements and processes. An "unaffiliated interface" or "unaffiliated application interface" refers to an interface (e.g., a user interface or interactive presentation of information) of an unaffiliated application.

FIG. 1 is a block diagram of an example system 100 enabling multidirectional integration of diverse processes and subsystems of unaffiliated computing systems and/or unaffiliated applications, according to various potential example implementations. System 100 may include unaffiliated computing systems 102A and 102B (which may include one or more computing devices of third-party enterprises in one or more locations), collectively referred to as unaffiliated computing systems 102, one or more user devices 103 (which may include multiple computing devices of one or more users in one or more locations), one or more primary computing systems 104 (which may include one or more computing devices of an enterprise in one or more locations). The unaffiliated computing systems 102 can be in communication with the primary computing system 104, which can be in communication with the user device 103. The system can include a network 101 to facilitate communications among the unaffiliated computing systems 102, the user device 103, and the primary computing system 104 over, for example, the internet or another network via any of a variety of network protocols such as Ethernet, Bluetooth, Cellular, or Wi-Fi.

The unaffiliated computing systems 102 may be the computing systems of information technology service providers, financial service providers (e.g., "FinTech" companies), and/or non-financial service providers. For example, unaffiliated computing systems 102 of non-financial institutions may be associated with marketing platforms (e.g., "Mailchimp"), expense management (e.g., "Expensify"), time management (e.g., "Harvest"), client onboarding (e.g., "Gusto"), and legal solutions (e.g., "LegalZoom").

The user device 103 may include one or more mobile and non-mobile devices such as smartphones, tablet computing devices, wearable computing devices (e.g., a smartwatch, smart optical wear, etc.), personal computing devices such as laptops, voice-activated digital assistance devices (e.g., smart speakers having chat bot capabilities), portable media devices, vehicle infotainment systems, etc., that may access one or more software applications running locally or remotely. In some examples, a user device 103 may access the system 100 through various user devices 103 at the same time or at different times. For example, the user may access the system 100 via a digital assistance device 103 while also accessing the system 100 using a wearable computing device 103 (e.g., a smart watch). In other examples, the user may access the system 100 via a digital assistance device 103 and later access the system 100 via a vehicle infotainment system 103. The client application 112 can execute on the user device 103. The client application 112 can be administered by the primary computing system 104 (via, e.g., data exchanged between the client application 112 and the primary computing system 104 through secured communications).

In some embodiments, the primary computing system 104 may be the computing system of a financial institution that provides financial services (e.g., demand deposit accounts, credit accounts, etc.) to a plurality of customers, and may thus be a financial institution computing system. The financial institution computing system may provide banking services to user devices 103 by, for example, allowing users to use a client application running on the user devices 103 to, for example, deposit funds into accounts, withdraw funds from accounts, transfer funds between accounts, view account balances, and the like. In other implementations, the primary computing system 104 is not a financial institution computing system. In some implementations, the primary computing system 104 may be a backend computer system that interacts with the user devices 103 and supports other services offered by the primary computing system 104, such as information technology (IT) services.

The primary computing system 104 can include one or more processors implemented as a general-purpose processor, an ASIC, one or more FPGAs, a DSP, a group of processing components, or other suitable electronic processing components structured to control the operation of the primary computing system 104. The primary computing system 104 can include memory (e.g., RAM, ROM, NVRAM, Flash Memory, hard disk storage), may store data and/or computer code for facilitating at least some of the various processes described herein, as well as one or more data repositories (which may include, e.g., database records such as user data, electronic activities, and acquired information). In this regard, the memory may store programming logic that, when executed by the one or more processors, control the operation of the primary computing system 104.

For instance, the memory can have computer-executable instructions that the one or more processors are configured to execute.

The primary computing system 104 can manage or store primary data 124. The primary data 124 can include personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), financial data (e.g., income, assets, credit score), or other user or account data that is maintained or otherwise accessible to the primary computing system 104. The primary computing system 104 can receive the primary data 124 or subsets thereof via, for example, the client application 112.

The unaffiliated computing systems 102A and 102B can include databases 106A and 106B, respectively (collectively referred to as databases 106), which may include unaffiliated applications or components thereof (e.g., interfaces of the applications). The databases 106 can store the tertiary data 108A and 108B (collectively referred to as tertiary data 108) and the unaffiliated application interfaces 110A and 110B (used interchangeably with unaffiliated interfaces 110A and 110B, respectively, and collectively referred to as unaffiliated application interfaces 110). The databases 106 can store the executable code for the unaffiliated interfaces 110 to be provided via the client application 112. The unaffiliated interfaces 110, or variations thereof, may otherwise only be provided by corresponding unaffiliated applications. The databases 106 can store API protocols for interfacing with the primary computing system 104. The databases 106 can use RAM, ROM, NVRAM, Flash Memory, or hard disk storage to store data and/or computer code for facilitating at least some of the various processes described herein, as well as one or more data repositories.

The tertiary data 108 can include data identifying a user of the unaffiliated computing systems 102. For example, the tertiary data 108 can include personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), and financial data (e.g., income, assets, credit score), or other user or third-party account data that is maintained or otherwise accessible to one or more unaffiliated computing systems 102. The unaffiliated computing systems 102 can receive the tertiary data 108 or subsets thereof via corresponding unaffiliated applications.

The unaffiliated computing systems 102 and/or the unaffiliated applications can administer, maintain, and/or generate the unaffiliated interfaces 110. In various implementations, the unaffiliated interfaces 110 can include the tertiary data 108, in combination with coding that defines or otherwise provides for presentation of the tertiary data 108 and user interactivity with the tertiary data 108. The unaffiliated interfaces 110 can include the tertiary data 108 from the unaffiliated computing system 102 that generates the unaffiliated interfaces 110 (e.g., unaffiliated computing system 102A) and/or another unaffiliated computing system 102 (e.g., unaffiliated computing system 102B). For example, the unaffiliated interfaces 110A of the unaffiliated computing system 102A can include tertiary data 108A, and/or tertiary data 108B of the unaffiliated computing system 102B. The unaffiliated interface 110 can be associated, generated, or processed by unaffiliated computing systems 102 such as marketing platforms (e.g., "Mailchimp"), expense managers (e.g., "Expensify"), time managers (e.g., "Harvest"), client onboarding (e.g., "Gusto"), and legal solutions (e.g., "LegalZoom"). The unaffiliated interfaces 110 can also include the primary data 124 from the primary computing system 104. The unaffiliated interfaces 110 can include the tertiary data 108, the primary data 124, an analyzed, filtered, or processed version of the tertiary data 108, and/or an analyzed, filtered, or processed version of the primary data 124.

The unaffiliated computing systems 102 can provide or identify the unaffiliated interfaces 110 to the primary computing system 104. The unaffiliated computing systems 102 can provide information about the unaffiliated computing system 102 and the unaffiliated interfaces 110. For example, the unaffiliated computing systems 102 can provide an image or description of the unaffiliated interface 110. The unaffiliated computing systems 102 can identify functionalities of the unaffiliated interface 110. For example, the unaffiliated computing systems 102 can identify that the unaffiliated interface 110 can automatically generate certain data or provide certain interactivity. The unaffiliated computing systems 102 can transmit the executable code to the primary computing system 104 and/or to the client application 112 for presenting and displaying the unaffiliated interface 110 (and associated data) via the client application 112 that is executing on the user device 103.

The application manager 114 of the primary computing system 104 can identify the unaffiliated application and/or the unaffiliated interfaces 110 to the user via the client application 112. For example, the application manager 114 can present, via the client application 112 executing on the user device 103, a listing, of one or more unaffiliated applications and/or unaffiliated application interfaces, and/or one or more sets (combinations) of unaffiliated applications or unaffiliated application interfaces that are "bundled" together, that are administered by respective unaffiliated computing systems 102. For example, the application manager 114 can cause the client application 112 to identify the unaffiliated interface 110A or a unaffiliated application that otherwise provides the unaffiliated interface 110A. The application manager 114 can cause the client application 112 to display information about the unaffiliated interface 110A. For example, the application manager 114 can cause the client application 112 to display an image or description of the unaffiliated interface 110A and the unaffiliated interface 110B. In another example, the application manager 114 can cause the client application 112 to present or display information indicating that the unaffiliated interface 110B can automatically generate forms and/or provide certain analyses. Additionally or alternatively, the application manager 114 can cause the client application 112 to present or display functionalities of the unaffiliated interface 110B. In various embodiments, the client application 112 can perform one or more of the above steps autonomously, without being caused to do so by the primary computing system 102 or a component thereof.

If the application manager 114 detects a selection via the client application 112 of a unaffiliated application and/or unaffiliated interface 110A, the application manager 114 can cause the client application 112 to identify functionalities of the unaffiliated application and/or unaffiliated interface 110A. For example, the application manager 114 can cause the client application 112 to indicate that the unaffiliated application and/or unaffiliated interface 110A can automatically generate forms for the user of the client application 112 running on the user device 103.

The application manager 114 can detect, via the client application 112, a selection of a unaffiliated application 106 and/or unaffiliated interface 110A of the for integration with the client application 112. For example, a user can select the unaffiliated application and/or the unaffiliated interface 110A using the client application 112 executing on the user device 103. In another example, selection of the unaffiliated application and/or unaffiliated interface 110A can cause the client application 112 to request code (e.g., for a widget) for the unaffiliated interface 110A. The client application 112 can request the executable code directly from the unaffiliated computing system 102A, from the unaffiliated application that normally provides the unaffiliated interface 110A or a variation thereof (e.g., via application-to-application communication on the user device 103), and/or via the primary computing system 104. The application manager 114 and/or the client application 112 can receive the requested executable code. If the primary computing system 104 receives the code, then the primary computing system 104 can transmit the code to the client application 112. The client application 112 can execute the code (and present, e.g., the widget) to provide the functionality and/or data of the unaffiliated interface 110A of the corresponding unaffiliated application.

The application manager 114 can receive executable code from the unaffiliated computing system 102A that interfaces with the unaffiliated application corresponding to the unaffiliated interface 110A. The client application 112 can receive the executable code via a network and execute the code to present or display the unaffiliated interface 110A. The executable code may be accompanied or followed by instructions from the primary computing system 104 for when or how to display the interface, such as rules requiring certain input from the user before the interface is activated or enabled. For example, the application manager 114 can cause the client application 112 to execute the executable code to present or display the unaffiliated interface 110A if the user grants permission to share certain data with the unaffiliated computing system 102 corresponding to the unaffiliated application related to the unaffiliated application interface. In various embodiments, the client application 112 executes code once the code, or segments thereof, is received from the primary computing system 104 and/or the unaffiliated computing system 102.

The integration manager 116 of the primary computing system 104 can determine whether the unaffiliated application is integrated with the client application 112. For example, the integration manager 116 can query an identifier of the unaffiliated computing system 102A or the unaffiliated application in the database 122 to identify its integration status (e.g., integrated or not integrated). If the unaffiliated application is not integrated with the client application 112, then the integration manager 116 can, for example, initialize an API to integrate the unaffiliated application interface with the client application 112. If the unaffiliated application is integrated with the client application 112, then the integration manager 116 can verify whether sharing of primary data 124 with the unaffiliated application is permitted.

The integration manager 116 can initialize the API with the unaffiliated computing system 102A to establish bidirectional communications. In some implementations, the integration manager 116 can generate an API request (used interchangeably with API call) identifying the client application 112 and the unaffiliated interface 110A. The API request can include an authentication token/security token to authenticate the primary computing system 104 with the unaffiliated computing system 102A. In some implementations, the integration manager 116 can transmit the API request via the API to the unaffiliated computing system 102A administering the unaffiliated application 106A.

The unaffiliated computing system 102A can establish the bidirectional data exchange with the primary computing system 104. In some implementations, the unaffiliated computing system 102A can receive the API request from the integration manager 116. The unaffiliated computing system 102A can identify the primary computing system 104 or the client application 112 based on the API request (e.g., based on the authentication token). The unaffiliated computing system 102A can approve the bidirectional integration to provide the primary computing system 104 with tertiary data 108A or to receive the primary data 124 from the primary computing system 104. This may serve to, directly or indirectly, link the client application with the unaffiliated application. The unaffiliated computing system 102A can notify the primary computing system 104 that the bidirectional integration is established. For example, the unaffiliated computing system 102A can transmit a response with a confirmation to the primary computing system 104, potentially with parameters corresponding to the linking (e.g., what data is sharable, what analyses are to be performed, what functionality is to be provided, etc.).

The integration manager 116 can determine whether the primary data 124 is permitted to be shared with the unaffiliated computing system 102A. The integration manager 116 can query (e.g., in the database 122) rules or regulations that define sharing of the primary data 124. For example, a user (e.g., via the client application 112) can define whether the primary data 124 can be shared with the unaffiliated computing system 102A or unaffiliated computing systems in general. In another example, the client application 112 can receive settings from the user that specify which primary data 124 can be shared with the unaffiliated computing system 102A or unaffiliated computing systems in general.

The integration manager 116 can transmit the primary data 124 to the unaffiliated computing system 102A. The integration manager 116 can identify a subset of the primary data 124 relating to the unaffiliated interface 110A to be accessible in the client application 112. For example, the integration manager 116 can identify that locations of the user device 103 are relevant to the unaffiliated interface 110A that analyzes activities of the user device 103 at different locations. In this example, the subset of the primary data 124 can be the location history of the user device 103. The integration manager 116 can transmit the subset of the primary data 124 via the API to the unaffiliated computing system 102A administering the unaffiliated interface 110A.

The unaffiliated computing system 102A can provide unaffiliated interfaces to the interface manager 118 of the primary computing system 104. The unaffiliated computing system 102A can receive the subset of the primary data 124 from the integration manager 116, and generate the unaffiliated interfaces 110. The unaffiliated computing system 102A can transform, analyze, organize, compare, or convert the subset of the primary data 124 to generate the unaffiliated interfaces 110. For example, the unaffiliated computing system 102A can receive the location history of the user device 103, and analyze the location history to generate unaffiliated interfaces 110 indicating location-based analytics for display by the unaffiliated interface 110A via the client application 112 executing on the user device 103. The unaffiliated computing system 102A can transmit the unaffiliated interfaces 110 to the interface manager 118 via the API.

The unaffiliated computing system 102A can compare tertiary data 108A of the unaffiliated computing system 102A to the primary data 124 to generate the unaffiliated interfaces 110. For example, the unaffiliated computing system 102A can receive the location history of the user device 103, and compare the location history to preconfigured locations to authenticate whether the user device 103 was located in authorized locations. The unaffiliated computing system 102A can generate unaffiliated interfaces 110 indicating whether the locations were authorized for display via the client application 112 executing on the user device 103.

The interface manager 118 can receive or manage the unaffiliated interfaces 110 from the unaffiliated computing systems 102. The interface manager 118 can receive the unaffiliated interfaces 110 from the unaffiliated computing systems 102 via the API. The unaffiliated interfaces 110 can be based on the subset of the primary data 124 transmitted from the integration manager 116 to each of the unaffiliated computing systems 102. In some implementations, unaffiliated interfaces 110 can be based on both the subset of the primary data 124 and the tertiary data 108.

The interface manager 118 can provide the unaffiliated interfaces 110 to the client application 112 executing on the user device 103. The interface manager 118 can provide the unaffiliated interfaces 110 to the user device 103 for presentation by the client application 112. The client application 112 can present the unaffiliated interface without requiring the user to manually provide the primary data 124 to the unaffiliated application, the unaffiliated interface 110, or to the unaffiliated computing system 102A. For example, the client application 112 can present the unaffiliated interface that provides an analysis (e.g., frequency of certain locations detected via global positioning system (GPS) or other location sensors of user devices) without the user having to manually provide such information to the unaffiliated application, which may otherwise independently and separately provide the functionality of the unaffiliated application interface that is now being provided by the client application 112.

The integration manager 116 can request tertiary data 108A from the unaffiliated computing system 102A. The integration manager 116 may request the tertiary data 108A before or concurrently with transmitting the primary data 124 to the unaffiliated computing system 102A. The integration manager 116 can request the tertiary data 108A that is associated with the primary computing system 104 or the client application 112. For example, the integration manager 116 can request tertiary data 108A indicating whether the user device 103 authenticated or allowed the unaffiliated computing system 102A to access the database 122 of the primary computing system 104 (e.g., to request payments or security information). The integration manager 116 can send the request to the unaffiliated computing system 102A via the API.

The unaffiliated computing system 102A can provide the tertiary data 108A to the integration manager 116 of the primary computing system 104. The unaffiliated computing system 102A can receive the request for the tertiary data 108A. The unaffiliated computing system 102A can parse or analyze the request to identify the tertiary data 108A to provide to the integration manager 116. The unaffiliated computing system 102A can identify a subset of the tertiary data 108A in the database 106A of the unaffiliated computing system 102A. For example, the unaffiliated computing system 102A can identify the tertiary data 108A that indicates whether the user authenticated or allowed the unaffiliated computing system 102A to access the integration manager 116 (e.g., to request payments or security tokens).

The unaffiliated computing system 102A can send the tertiary data 108A to the integration manager 116 via the API.

The interface manager 118 can administer, maintain, or generate client application interfaces 126 (used interchangeably with client application interfaces). The client application interfaces 126 can include the primary data 124. The client application interfaces 126 can additionally or alternatively include the tertiary data 108. For example, the client application interfaces 126 can include the tertiary data 108 from any of the unaffiliated computing systems 102 (e.g., tertiary data 108A from the tertiary data 102A and/or tertiary data 108B from the unaffiliated computing system 102B). The interface manager 118 can generate the client application interfaces 126 by, for example, analyzing, filtering, or processing the tertiary data 108 or the primary data 124.

The interface manager 118 can present the client application interfaces 126 in the client application 112 based on the tertiary data 108A. In some implementations, client application interfaces 126 can be based on the subset of the primary data 124 and the tertiary data 108A. The interface manager 118 can generate the client application interfaces 126 for presentation in the client application 112. In some implementations, the interface manager 118 can compare tertiary data 108A of the unaffiliated computing system 102A to the primary data 124 to generate the client application interfaces 126. For example, the tertiary data 108A can indicate scheduled or preconfigured access by the unaffiliated computing system 102A and the primary data 124 can be a log of access by the unaffiliated computing system 102A. The interface manager 118 can compare the tertiary data 108A to the primary data 124 to determine whether the access was authorized and expected. The interface manager 118 can generate unaffiliated interfaces based on the comparison.

The interface manager 118 can provide or transmit the client application interfaces 126 to the client application 112. The interface manager 118 can cause the client application 112 to indicate that the unaffiliated computing system 102A is configured or scheduled to interface or access (e.g., withdraw money or retrieve activities for analysis) an account administered by the primary computing system 104 for a user of the user device 103, without the user having to manually provide such information. The client application 112 can present, display, or install client application interfaces 126 from the primary computing system 104. The client application 112 can receive user inputs from users to interact with the client application interfaces 126. In some embodiments, the interface manager 118 can additionally or alternatively transmit the client application interfaces 126 to one or more unaffiliated computing systems 102 for presentation in respective unaffiliated applications that are in communication with corresponding unaffiliated computing systems 102.

In various embodiments, the client application 112 can present the listing or bundle of the unaffiliated application and/or unaffiliated application interfaces 110 administered by respective unaffiliated computing systems 102. The client application 112 can receive information on the unaffiliated application and/or unaffiliated application interfaces 110 from the interface manager 118. The client application 112 can display images and/or descriptions of the unaffiliated application and/or unaffiliated interfaces 110B that are available.

The application manager 114 can detect or otherwise identify or determine, via the client application 112, a selection of one or more unaffiliated applications and/or unaffiliated application interfaces 110 to be integrated with the client application 112. For example, a user can select a unaffiliated application (or a bundle thereof) via the client application 112 executing on the user device 103, and the client application can transmit an indication of the selection to the application manager 114. In another example, selection of the unaffiliated application can cause the client application 112 to request an executable widget (or other sub-system, process, or code) from the unaffiliated computing system 102B. The client application 112 can request the executable widget directly from the unaffiliated computing system 102B or via the primary computing system 104. Responsive to the request, the primary computing system 104 and/or the client application 112 can receive the executable widget. If the primary computing system 104 receives the widget, then the application manager 114 can provide or transmit the widget to the client application 112. The client application 112 can execute the widget to provide the unaffiliated interface 110A of the unaffiliated computing system 102A.

In yet another example, selection of the unaffiliated application and/or unaffiliated interface can cause the client application 112 to automatically select and request the unaffiliated interface 110A of the unaffiliated computing system 102A and the unaffiliated interface 110B of the unaffiliated computing system 102B. For example, the unaffiliated interface 110A of the unaffiliated computing system 102A and the unaffiliated interface 110B of the unaffiliated computing system 102B can be in a set or "bundle." The application manager 114 can receive executable code from the unaffiliated computing system 102B that corresponds to the unaffiliated interface 110B of the unaffiliated computing system 102B for presentation via the client application 112. The client application 112 can execute the code to install, display, present, or initialize the unaffiliated interface 110B of the unaffiliated computing system 102B. For example, the application manager 114 can present the unaffiliated interface 110B of the unaffiliated computing system 110B via the client application 112 executing the code.

The integration manager 116 can determine whether the unaffiliated computing system 102B that administers the selected unaffiliated application is linked with the primary computing system 104. For example, the integration manager 116 can query an identifier of the unaffiliated computing system 102B in the database 122 to identify its integration status (e.g., linked or not linked). If the unaffiliated computing system 102B is not linked to the primary computing system 104, then the primary computing system 104 can initialize the API. If the unaffiliated computing system 102B is linked the primary computing system 104, then the integration manager 116 can verify whether sharing is permitted.

The integration manager 116 can initialize the API link with the unaffiliated computing system 102B to establish bidirectional communications. In some implementations, the integration manager 116 can generate an API request identifying the client application 112 and the unaffiliated application. The API request can include an authentication token to authenticate the primary computing system 104 with the unaffiliated computing system 102B. In some implementations, the integration manager 116 can transmit the API request via the API to the unaffiliated computing system 102B administering the unaffiliated interface 110B.

The unaffiliated computing system 102B can establish the bidirectional link with the integration manager 116. In some implementations, the unaffiliated computing system 102B can receive the API call from the integration manager 116. The unaffiliated computing system 102B can identify the primary computing system 104 or the client application 112 based on the API call. The unaffiliated computing system 102B can approve the bidirectional link to provide the integration manager 116 with tertiary data 108B or to receive the primary data 124 from the integration manager 116. The unaffiliated computing system 102B can notify the primary computing system 104 that the bidirectional link is initialized. For example, the unaffiliated computing system 102B can transmit a confirmation or other suitable response to the integration manager 116.

The integration manager 116 can determine whether the tertiary data 108A and the primary data 124 are permitted to be shared with the unaffiliated computing system 102B. The integration manager 116 can query, in the database 122, rules or regulations that define sharing of the tertiary data 108A. For example, the unaffiliated computing system 102A can define whether the tertiary data 108A can be shared with the unaffiliated computing system 102B or unaffiliated computing systems 102 in general. The integration manager 116 can query rules or regulations in the database 122 regarding sharing of primary data 124. For example, a user of the primary computing system 104 can define whether the primary data 124 can be shared with the unaffiliated computing system 102B or unaffiliated computing system 102 in general. In another example, the client application 112 can receive settings from the user that specify which primary data 124 can be shared with the unaffiliated computing system 102B or unaffiliated computing systems 102 in general.

The integration manager 116 can transmit the tertiary data 108A and the primary data 124 to the unaffiliated computing system 102B. The integration manager 116 can identify a subset of the tertiary data 108A relating to the unaffiliated interface 110B administered by the unaffiliated computing system 102B. For example, the integration manager 116 can determine that the identifier of the unaffiliated computing system 102A is relevant to the unaffiliated interface 110B that monitors access to the primary computing system 104 by the unaffiliated computing systems 102. The integration manager 116 can transmit the subset of the tertiary data 108A via the API to the unaffiliated computing system 102B administering the unaffiliated interface 110B.

The integration manager 116 can identify a subset of the primary data 124 relating to the unaffiliated interface 110B administered by the unaffiliated computing system 102B. For example, the integration manager 116 can determine that the communication protocol configured between the unaffiliated computing system 102A and the integration manager 116 is relevant to the unaffiliated interface 110B that monitors activities of the client application 112. In this example, the subset of the primary data 124 can indicate the communication protocols (e.g., data sharing) configured between the unaffiliated computing system 102A and the integration manager 116. The integration manager 116 can transmit the subset of the primary data 124 via the API to the unaffiliated computing system 102B administering the unaffiliated interface 110B.

The unaffiliated computing system 102B can provide unaffiliated interfaces 110 to the interface manager 118. The unaffiliated computing system 102A can receive the subset of the tertiary data 108A and the primary data 124 from the primary computing system 104, and generate the unaffiliated interfaces 110. The unaffiliated computing system 102B can generate the unaffiliated interfaces for display by the unaffiliated interface 110B via the client application 112 executing on the user device 103. The unaffiliated computing system 102B can transmit the unaffiliated interfaces 110 to the primary computing system 104 via the API.

The unaffiliated computing system 102B can transform, analyze, organize, compare, or convert the subset of the tertiary data 108A and primary data 124 to generate the unaffiliated interfaces 110. For example, the unaffiliated computing system 102B can receive the identifier of the unaffiliated computing system 102A and identification of the communication protocol configured between the unaffiliated computing system 102A and the primary computing system 104, and generate a unaffiliated interface 110 that indicates that the user is sharing data with the identified unaffiliated computing system 102A via the communication protocol.

In some implementations, the unaffiliated computing system 102B can compare the tertiary data 108A, the tertiary data 108B, and the primary data 124 to generate the unaffiliated interfaces 110. For example, the tertiary data 108B can define security configurations for the communication protocol identified by the primary data 124. The unaffiliated computing system 102B can generate a unaffiliated interface 110B that indicates that the user is sharing data with the identified unaffiliated computing system 102A via the communication protocol, and which security configurations are associated with the identified communication protocol.

The interface manager 118 can provide the unaffiliated interfaces 110 from the unaffiliated computing system 102B to the client application 112, if the client application does not receive the unaffiliated interfaces from unaffiliated computing systems 102. The interface manager 118 can receive the unaffiliated interfaces 110 from the unaffiliated computing system 102B via the API. The unaffiliated interfaces 110 can be based on the subset of the tertiary data 108A and the primary data 124 transmitted from the primary computing system 104 to the unaffiliated computing system 102B. In some implementations, unaffiliated interfaces 110 can be based on the subset of the primary data 124, the tertiary data 108A, and the tertiary data 108B.

In some implementations, the unaffiliated interface 110B can be an updated interface of a previously presented interface. For example, an initial unaffiliated interface 110B could have been based on just the primary data 124 and the tertiary data 108B. However, after the primary computing system 104 provided or transmitted the tertiary data 108A (e.g., additional information about the user), the unaffiliated computing system 102B can generate an updated interface for presentation in the client application. The updated interface can be based on (i) the primary data 124, (ii) the tertiary data 110B, and (iii) the tertiary data 110A.

The interface manager 118 can provide the unaffiliated interface 110B to the client application 112 executing on the user device 103. The client application 112 can present or display the unaffiliated interface 110B from the unaffiliated computing system 102B. The interface manager 118 can provide the unaffiliated interface 110B to the user device 103 for display by the client application 112. For example, the client application 112 can present the unaffiliated interface 110B that indicates data sharing with the identified unaffiliated computing system 102B via the communication protocol. The interface manager 118 can cause display of the unaffiliated interface 110B without the user having to manually provide the primary data 124, the tertiary data 108A, and the tertiary data 108B. In various embodiments, the client application 112 can perform one or more of the above steps autonomously, without being caused to do so by the primary computing system 102 or a component thereof.

The primary computing system 104 can include a database 122. The database 122 can store the tertiary data 108A-B and the primary data 124 associated with usage of the client application 112. The database 122 can also store executable code received from, and/or to be provided to, the unaffiliated computing systems 102. The database 122 can store the unaffiliated interfaces 110 for the to be integrated with the client application 112. The database 122 can store API protocols for interfacing with the unaffiliated computing systems 102. The database 122 can use RAM, ROM, NVRAM, Flash Memory, or hard disk storage to store data and/or computer code for facilitating at least some of the various processes described herein, as well as one or more data repositories.

Figure 2:
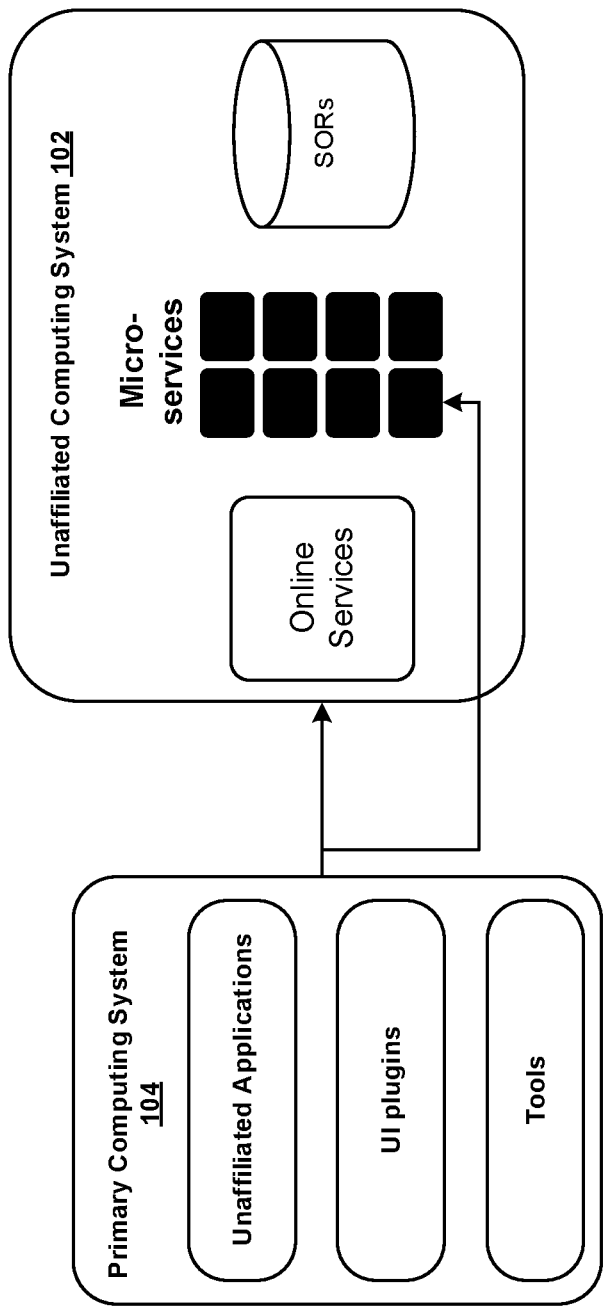
FIG. 2 is a block diagram of an example environment for bidirectional integration of diverse unaffiliated processes and subsystems, according to various potential example implementations.

FIG. 2 is a block diagram of an example environment for multidirectional integration of diverse unaffiliated processes and subsystems, according to various potential example implementations. The primary computing system 104 can include unaffiliated applications, UI plugins (e.g., application interfaces 110), and tools such as APIs, plugins, software development kits (SDKs), and web-hooks. The primary computing system 104 can communicate with online services and micro-services (e.g., unaffiliated computing systems 102). Unaffiliated computing system 102 may also include a system of record (SOR) for data management.

Figure 3C:
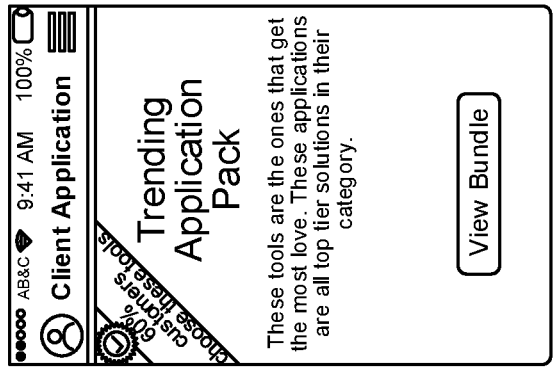
FIGS. 3A-3C provide example views presented in the client application, according to various potential example implementations.
Figure 3B:
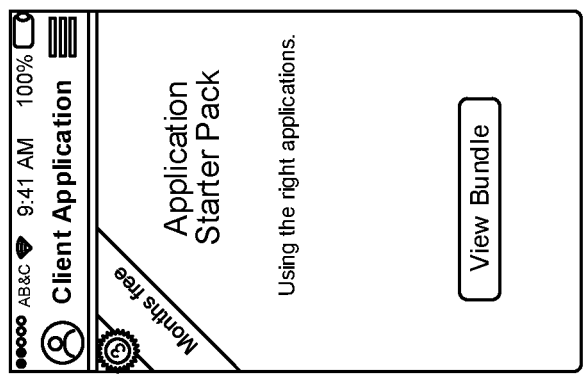
Figure 3A:
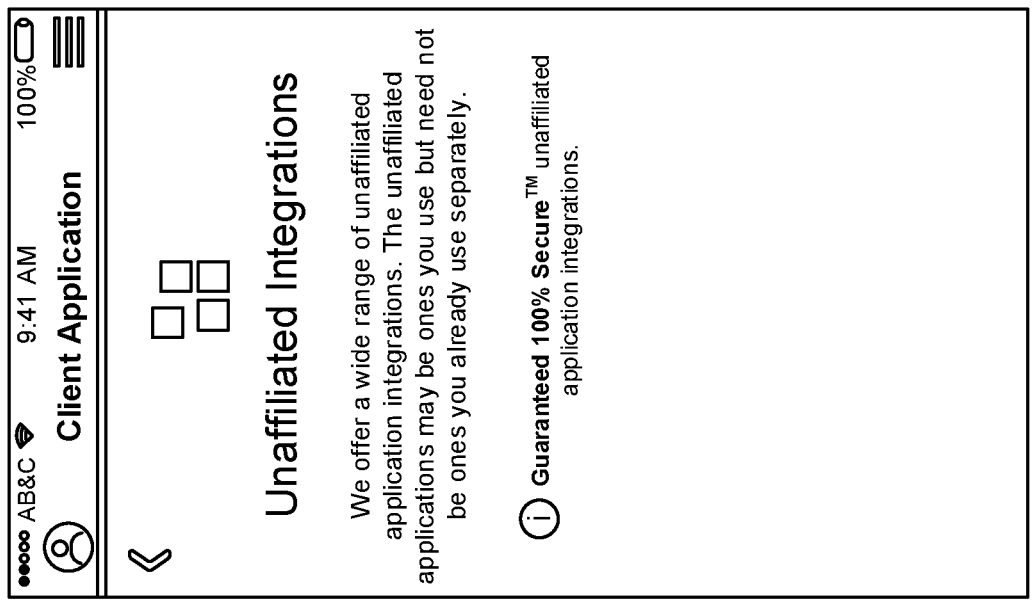
Figure 4D:
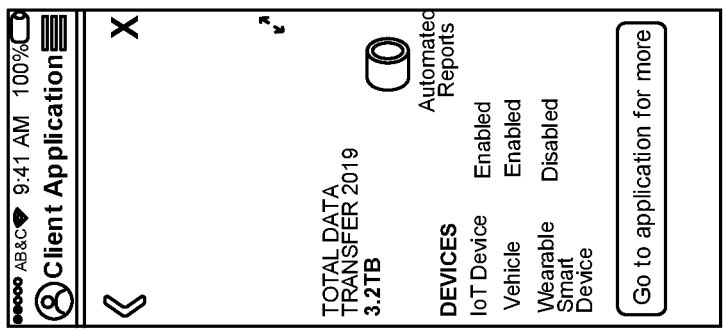
FIGS. 4A-4D provide example views presented in the client application, according to various potential example implementations.
Figure 4C:
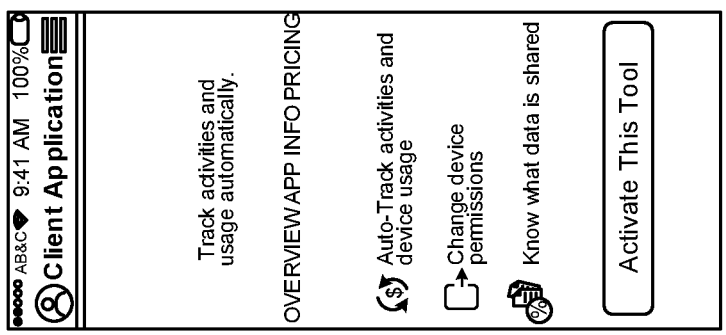
Figure 4B:
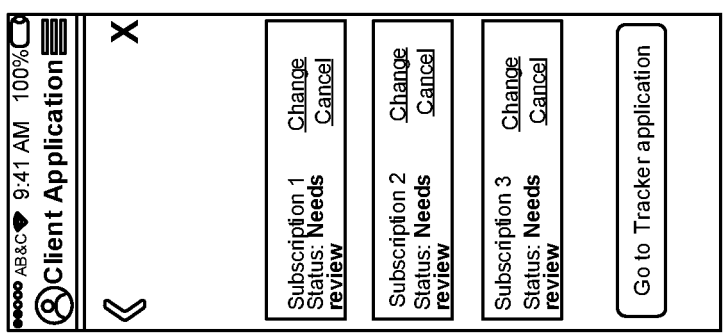
Figure 4A:
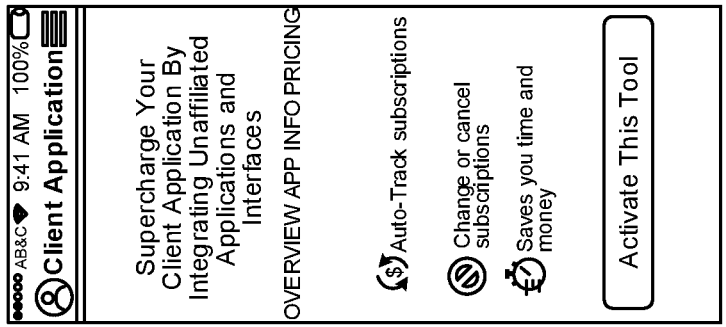
Figure 5A:
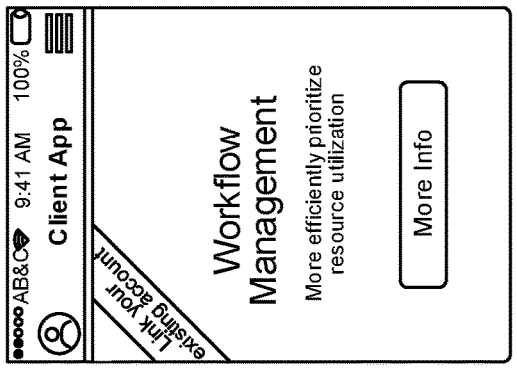
FIGS. 5A-5H provide example views presented in the client application, according to various potential example implementations.
Figure 5D:
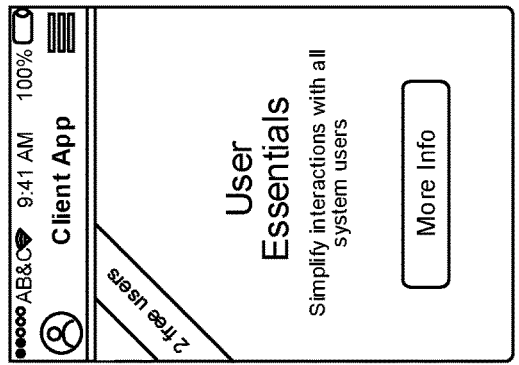
Figure 5B:
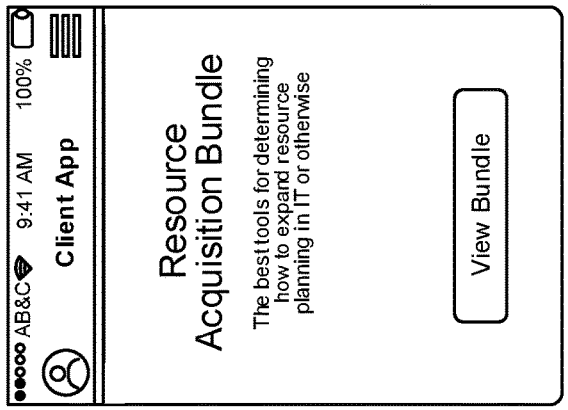
Figure 5C:
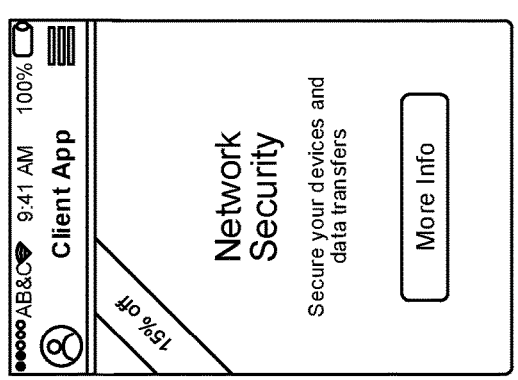
Figure 5E:
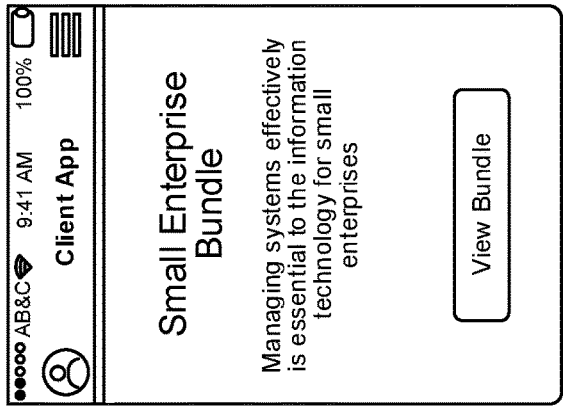
Figure 5G:
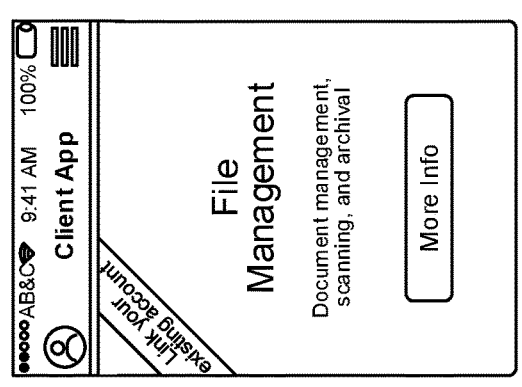
Figure 5F:
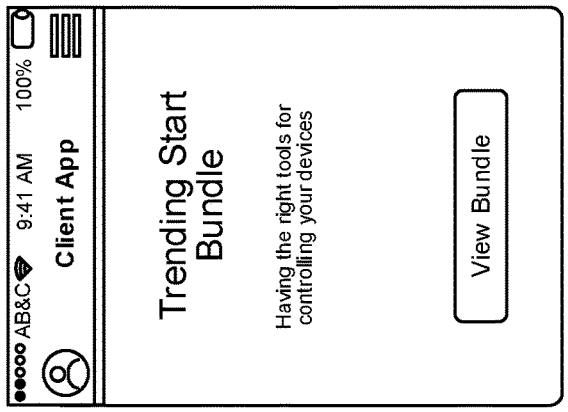
Figure 5H:
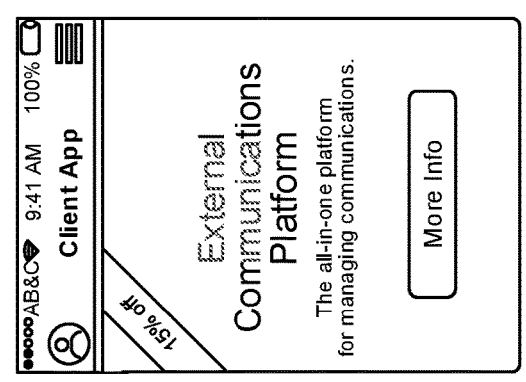

FIGS. 3A-3C provide example view presented in the client application 112, according to various potential example implementations. The views depict example descriptions of unaffiliated applications and/or unaffiliated interfaces 110.

FIGS. 4A-4D provide example views presented in the client application 112, according to various potential example implementations. The views provide example unaffiliated applications and/or unaffiliated application interfaces presented in the client application 112. The unaffiliated interfaces may be generated based on tertiary data 108 and/or primary data 124.

FIGS. 5A-5H provide example views presented in the client application 112, according to various potential example implementations. The views provide example unaffiliated applications and application interfaces 110 and example descriptions thereof.

Figure 6A:
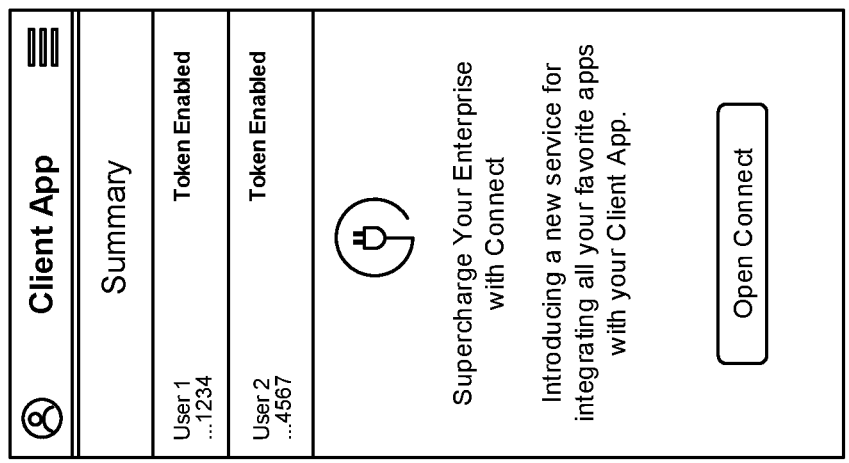
FIGS. 6A-6M provide example views of applications presented in networked portal of diverse unaffiliated processes and subsystems, according to various potential example implementations.
Figure 6C:
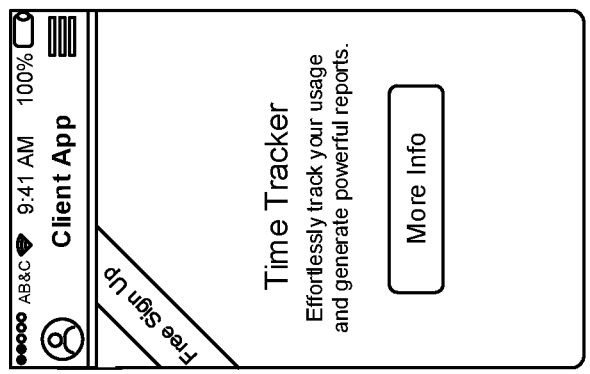
Figure 6B:
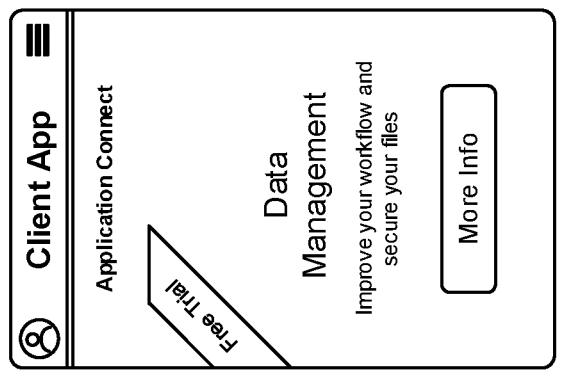
Figure 6D:
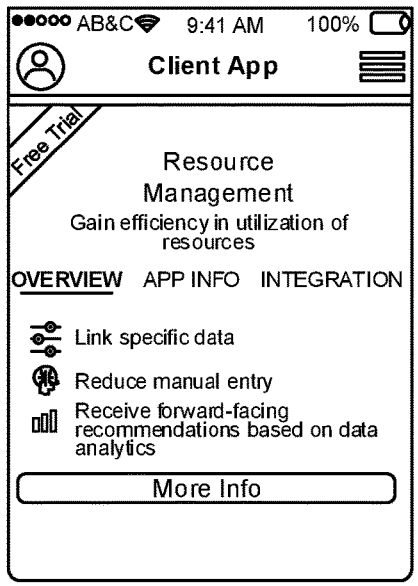
Figure 6E:
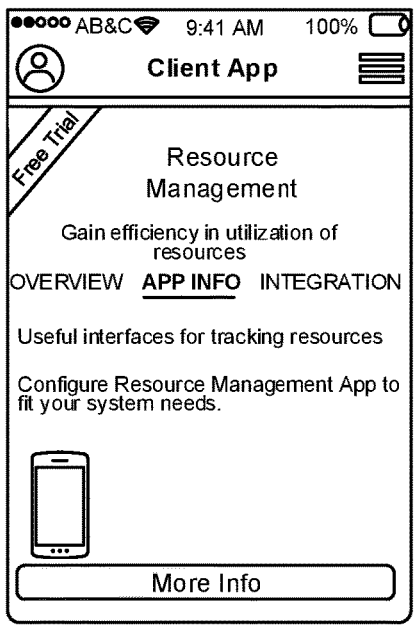
Figure 6F:
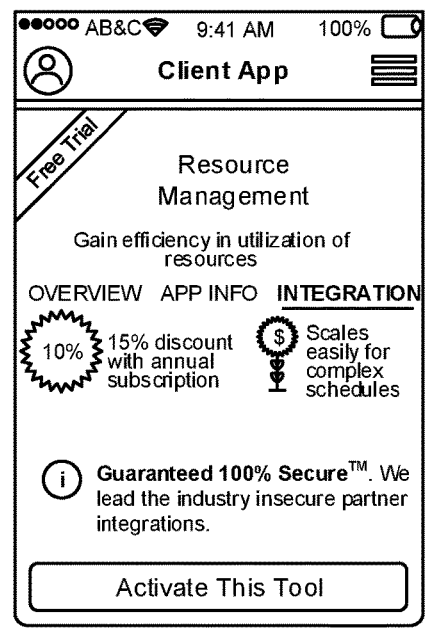
Figure 6J:
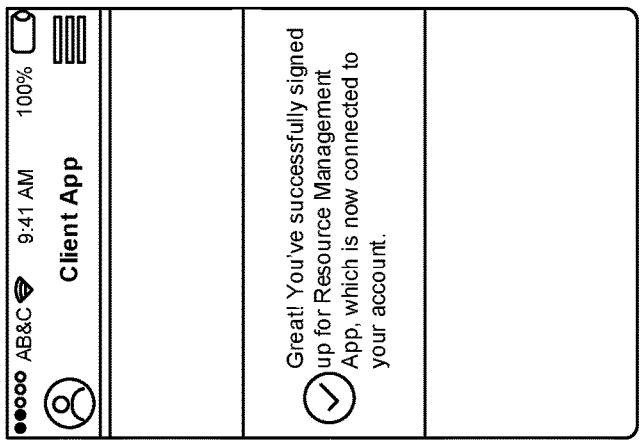
Figure 6I:
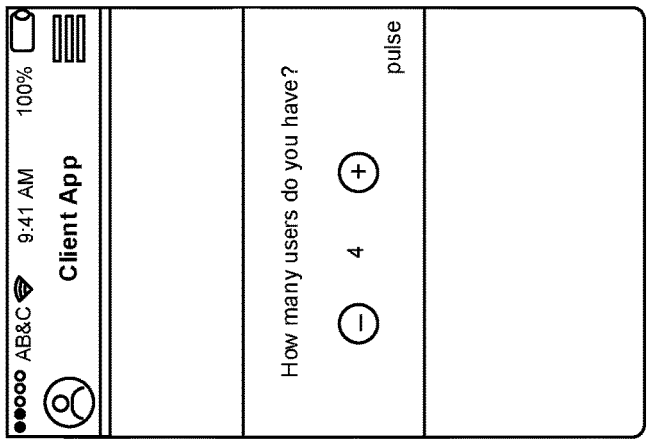
Figure 6G:
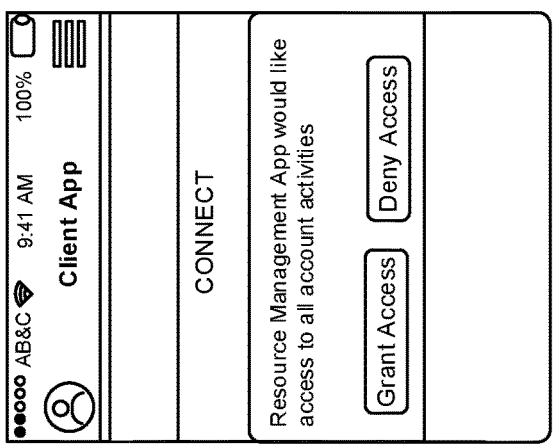
Figure 6H:
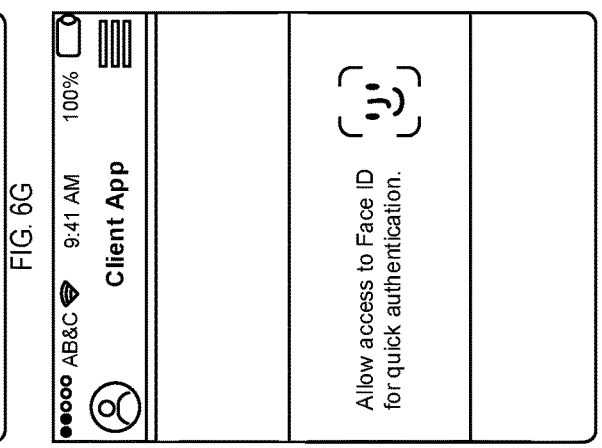
Figure 6L:
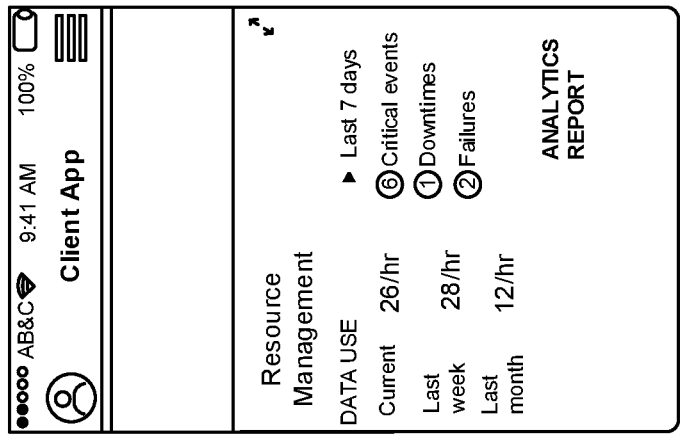
Figure 6K:
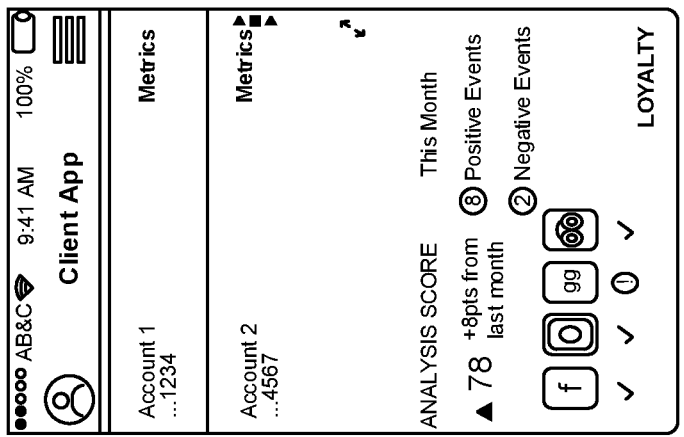
Figure 6M:
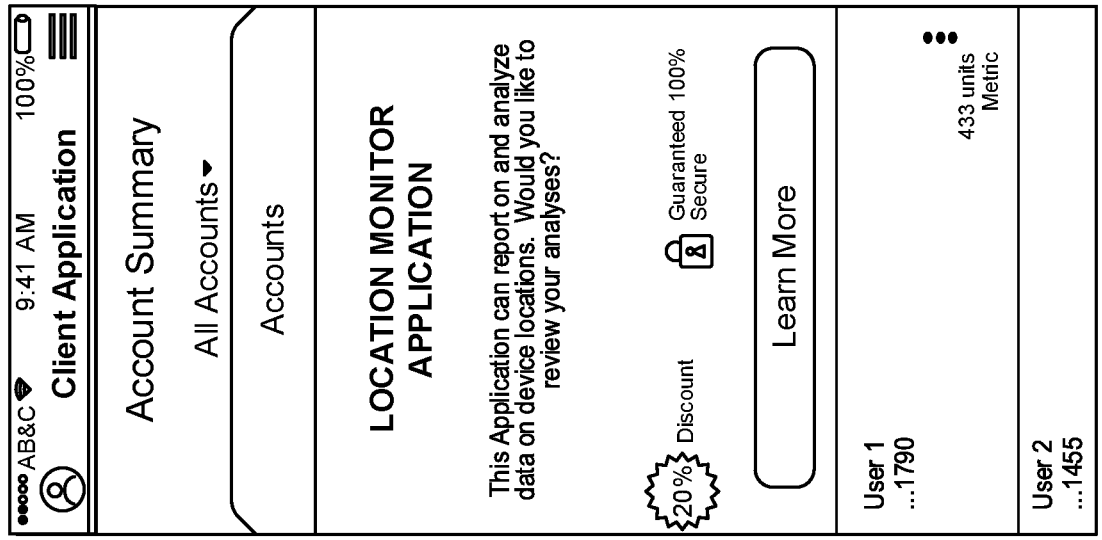

FIGS. 6A-6M provide example views presented in the client application 112, according to various potential example implementations. FIG. 6A provides an example view of the client application 112 identifying providing a unaffiliated application integration portal (named "Connect"). FIGS. 6B and 6C provide example views of the client application 112 describing potential unaffiliated applications and/or interfaces that can be integrated with the client application 112 through the portal. FIGS. 6D-6F provide example views of the client application 112 describing a unaffiliated application that could be integrated, with an "Overview" in FIG. 6D, "App Info" in FIG. 6E, and information on "Integration" in FIG. 6F. FIGS. 6G-6J provide example views of the client application 112 integrating with the a unaffiliated application or interface (identified as "Pulse"). FIGS. 6K and 6L provide example views of the unaffiliated interfaces 110 presented in the client application 112 based on the tertiary data 108 and/or the primary data 124. FIG. 6M provides an example view of the client application 112 describing a unaffiliated application with transaction analysis interfaces that could be integrated with the client application 112.

Figure 7A:
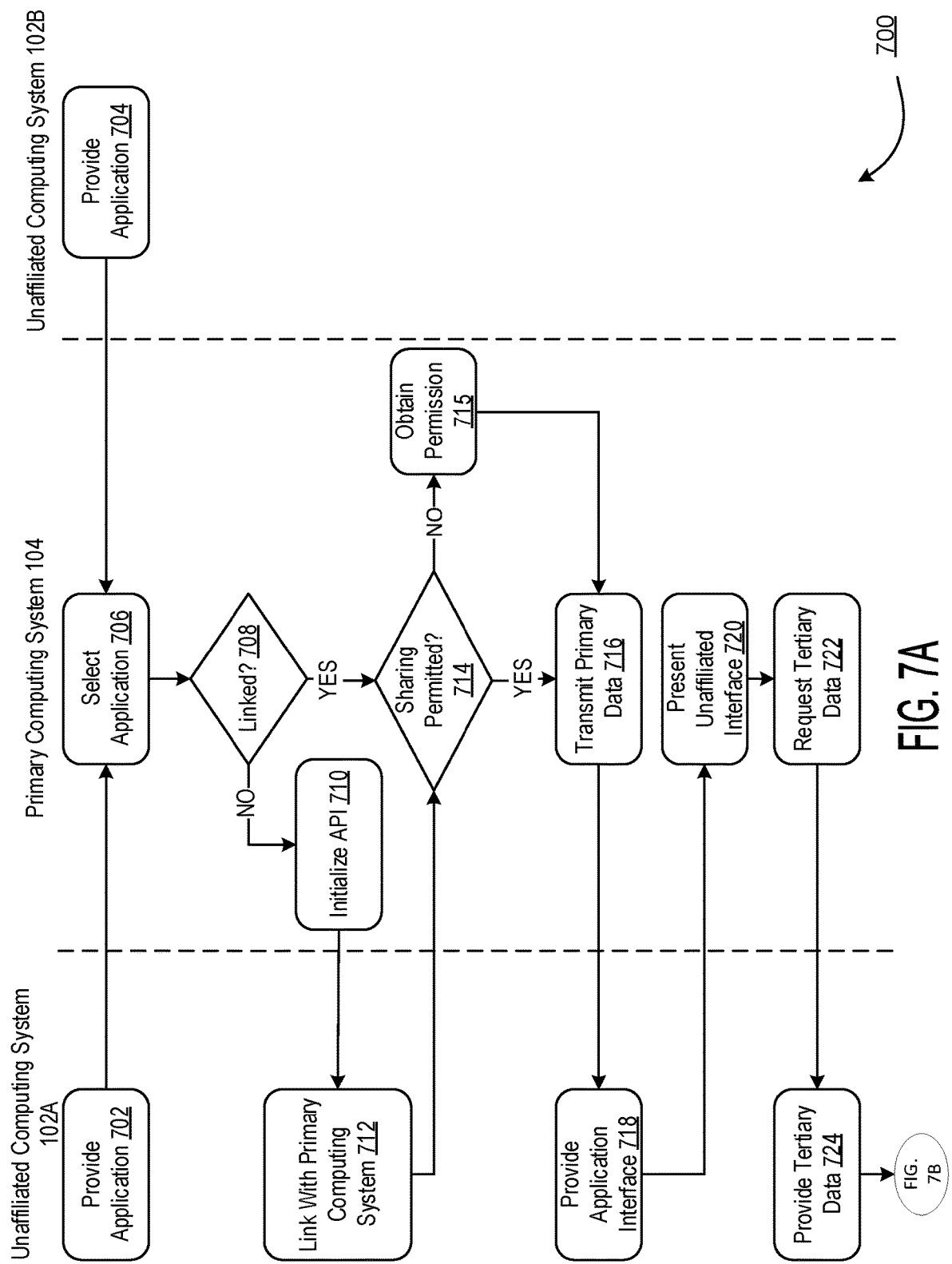

FIG. 7 is a flow diagram of an example method for multidirectional integration of diverse unaffiliated processes and subsystems, according to various potential example implementations. The method can be a computer-implemented method. Method 700 may be implemented using the system 100. As such, reference will be made to the system 100 when describing method 700. In one implementation, additional, fewer, and/or different operations may be performed. It will be appreciated that the order or flow of operations indicated by the flow diagrams and arrows with respect to the methods described herein is not meant to be limiting. For example, in one implementation, two or more of the operations of method 700 may be performed simultaneously.

At operation 702, the unaffiliated computing system 102A can provide or identify a unaffiliated application (with corresponding unaffiliated interface 110A) to the primary computing system 104. The unaffiliated computing system 102A can provide information about the unaffiliated computing system 102A, the unaffiliated application, and/or the unaffiliated interface 110A. For example, the unaffiliated computing system 102A can provide an image or description of the unaffiliated interface 110A. The unaffiliated computing system 102A can identify functionalities of the unaffiliated application 106 and/or the unaffiliated interface 110A. For example, the unaffiliated computing system 102A can indicate that the unaffiliated interface 110A can automatically generate forms based on primary data comprising user and/or account data. The unaffiliated computing system 102A may communicate with, provide, and administer instances of the unaffiliated application when the unaffiliated application is being transmitted to and/or is running on user devices. The unaffiliated computing system 102A can provide the executable code for the unaffiliated interface 110A to be presented and displayed via the client application 112 executing on the user device 103. The unaffiliated computing system 102A can enable or permit (or disable or prohibit) the unaffiliated application corresponding to application interface 110A for grouping (e.g., bundling) with other unaffiliated applications and interfaces 110. Bundling for the unaffiliated application may be enabled for all or only selected other applications and/or interfaces 110.

At operation 704, the unaffiliated computing system 102B can provide or identify another unaffiliated application (with corresponding unaffiliated interface 110B) to the primary computing system 104. The unaffiliated computing system 102B can provide information about the another unaffiliated computing system 102B, the unaffiliated application, and/or the unaffiliated interface 110B. For example, the unaffiliated computing system 102B can provide an image or description of the another unaffiliated application and/or the unaffiliated interface 110B. The unaffiliated computing system 102B can identify functionalities of the another unaffiliated application and/or the unaffiliated interface 110B. For example, the unaffiliated computing system 102B can indicate that the unaffiliated interface 110B can provide particular interactivity and analyses. The unaffiliated computing system 102B may communicate with, provide, and administer instances of the another unaffiliated application when the unaffiliated application is being transmitted to and/or is running on user devices. The unaffiliated computing system 102B can provide the executable code for the unaffiliated interface 110B to be presented and displayed via the client application 112 executing on the user device 103. The unaffiliated computing system 102B can enable or permit (or disable or prohibit) the another unaffiliated application corresponding to unaffiliated interface 110B for grouping (e.g., bundling) with other unaffiliated applications and interfaces 110, such as the unaffiliated application corresponding to unaffiliated interface 110A. Bundling for the another unaffiliated application may be enabled for all or only selected other applications and/or interfaces 110.

At operation 706, the primary computing system 104 can select one or more unaffiliated applications for potential integration with the client application 112 based on, for example, whether the unaffiliated applications and/or corresponding unaffiliated computing systems employ satisfactory security protocols. The unaffiliated applications selected as integration candidates can be presented in a listing of applications or application bundles in the client application 112 executing on the user device 103. The client application 112 may display images, textual descriptions, and/or other audiovisual information in presenting users with unaffiliated applications available for integration. The audiovisual information may describe, for example, functionalities provided by unaffiliated interfaces 110 of available unaffiliated applications, and the data used or provided by the unaffiliated interfaces 110. The client application 112 may provide the user to select unaffiliated applications, interfaces, and/or bundles for more information.

The primary computing system 104 can, for example, detect, via the client application 112, a selection of one or more unaffiliated applications or interfaces for integration with the client application 112. In response, the client application 112 and/or the primary computing system 104 may request code (e.g., an executable widget or other interface) from one or more unaffiliated computing systems 110. In certain embodiments, the client application 112 and/or the primary computing system 104 can, additionally or alternatively, request the code from one or more unaffiliated applications also executing on the user device 103. The client application 112 can request the executable code directly from the unaffiliated computing system 102A (or the unaffiliated application), or indirectly via the primary computing system 104. Responsive to the request, the primary computing system 104 and/or the client application 112 can receive the executable code. If the primary computing system 104 receives the code, then the primary computing system 104 can transmit the code to the client application 112. The client application 112 can execute the code to provide the unaffiliated interface 110A corresponding to an available unaffiliated application selected for integration.

At operation 708, the primary computing system 104 can determine whether the unaffiliated computing system 102A that administers the selected unaffiliated interface 110A is linked with the primary computing system 104 (via, e.g., one or more APIs). For example, the primary computing system 104 can query an identifier of the unaffiliated computing system 102A in the database 122 to identify its linked status (e.g., linked or not linked). If the unaffiliated computing system 102A is not linked with the primary computing system 104, then the primary computing system 104 can initialize an API at operation 710. If the unaffiliated computing system 102A is linked with the primary computing system 104, then the primary computing system 104 can verify whether data sharing is permitted at operation 714.

At operation 710, the primary computing system 104 can initialize the API with the unaffiliated computing system 102A to establish bidirectional communications. In some implementations, the primary computing system 104 can generate an API request identifying the client application 112 and the unaffiliated interface 110A. The API request can include an authentication token to authenticate the primary computing system 104 and the unaffiliated computing system 102A. In some implementations, the primary computing system 104 can transmit the API request via the API to the unaffiliated computing system 102A administering the unaffiliated interface 110A.

At operation 712, the unaffiliated computing system 102A can establish the bidirectional link with the computing system primary computing system 104. In some implementations, the unaffiliated computing system 102A can receive the API request from the primary computing system 104. The unaffiliated computing system 102A can identify the primary computing system 104 or the client application 112 based on the API request. The unaffiliated computing system 102A can approve the bidirectional link to provide the primary computing system 104 with tertiary data 108A or to receive the primary data 124 from the primary computing system 104 and/or the client application 112. The unaffiliated computing system 102A can notify the primary computing system 104 that the bidirectional integration is initialized or otherwise established. For example, the unaffiliated computing system 102A can transmit a response to the primary computing system 104 confirming the link is active.

At operation 714, the primary computing system 104 can determine whether the primary data 124 is permitted to be shared with the unaffiliated computing system 102A. The primary computing system 104 can query (e.g., in the database 122) rules or regulations that define sharing of the primary data 124. For example, a user of the primary computing system 104 can define whether the primary data 124 can be shared with the unaffiliated computing system 102A or unaffiliated computing systems 102 in general. In another example, the client application 112 can receive settings from the user that specify which primary data 124 can be shared with the unaffiliated computing system 102A or unaffiliated computing systems 102 in general. At operation 715, if data sharing is not permitted, the primary computing system 104, unaffiliated computing system 102A, and/or the client application 112 may request authorization to share account or user data (from, e.g., the user via the user device 103).

At operation 716, the primary computing system 104 can transmit the primary data 124 to the unaffiliated computing system 102A. The primary computing system 104 can identify a subset of the primary data 124 relating to the unaffiliated interface 110A of the unaffiliated application administered by the unaffiliated computing system 102A. For example, the primary computing system 104 can identify that locations of the user device 103 are relevant to the unaffiliated interface 110A that analyzes activities of the user device 103 at different locations. In this example, the subset of the primary data 124 can be the location history of the user device 103 (as determined, e.g., by detecting device locations using GPS or other location sensors of smart computing devices). The primary computing system 104 can transmit the subset of the primary data 124 via the API to the unaffiliated computing system 102A administering the unaffiliated interface 110A.

At operation 718, the unaffiliated computing system 102A can provide unaffiliated interfaces 110 to the primary computing system 104 and/or to the client application 112. The unaffiliated computing system 102A can receive the subset of the primary data 124 from the primary computing system 104, and generate the unaffiliated interfaces 110. The unaffiliated computing system 102A can transform, analyze, organize, compare, or convert the subset of the primary data 124 to generate the unaffiliated interfaces 110. In some implementations, generating unaffiliated interfaces may comprise combining certain information (e.g., the results of analyses of raw data) in combination with executable code that provides for interactivity with the information (e.g., graphical user interface (GUI) elements such as buttons, slides, or other selectors, text input fields, etc.). For example, the unaffiliated computing system 102A can receive the location history of the user device 103, and analyze the location history to generate unaffiliated interfaces 110 indicating location based analytics for display by the unaffiliated interface 110A via the client application 112 executing on the user device 103. The unaffiliated computing system 102A can transmit the unaffiliated interfaces 110 to the primary computing system 104 via the API.

In some implementations, the unaffiliated computing system 102A can compare tertiary data 108A of the unaffiliated computing system 102A to the primary data 124 to generate the unaffiliated interfaces. For example, the unaffiliated computing system 102A can receive the location history of the user device 103, and compare the location history to preconfigured locations to authenticate whether the user device 103 was located in authorized locations. The unaffiliated computing system 102A can generate unaffiliated interfaces 110 indicating whether the locations were authorized for display by the unaffiliated interface 110A via the client application 112 executing on the user device 103.

At operation 720, the client application 112 can present the unaffiliated interfaces 110 received from the unaffiliated computing system 102A. The primary computing system 104 can receive the unaffiliated interfaces 110 from the unaffiliated computing system 102A via the API. The unaffiliated interfaces 110 can be based on the subset of the primary data 124 transmitted from the primary computing system 104 to the unaffiliated computing system 102A. In some implementations, unaffiliated interfaces 110 can be based on the subset of the primary data 124 in combination with the tertiary data 108A.

The primary computing system 104 can provide the unaffiliated interfaces 110 to the client application 112 executing on the user device 103. The primary computing system 104 can provide the unaffiliated interfaces 110 to the user device 103 for display by the client application 112. The client application 112 can provide the unaffiliated interface 110 without requiring the user to separately and additionally provide the primary data 124 to the corresponding unaffiliated application and/or to the unaffiliated computing system 102A, and obtain (i.e., download and install) and run the corresponding unaffiliated application on a computing device. For example, the unaffiliated interface 110B can present an analysis (e.g., frequent locations) where services are provided by the primary computing system 104 (or by the enterprise associated with the primary computing system 104), without the user having to manually provide such information to the unaffiliated application corresponding to the unaffiliated computing system 102B.

At operation 722, the primary computing system 104 can request tertiary data 108A from the unaffiliated computing system 102A. The primary computing system 104 can request the tertiary data 108A before, or concurrently with, transmitting the primary data 124 to the unaffiliated computing system 102A. The primary computing system 104 can request the tertiary data 108A that is associated with the primary computing system 104 or the client application 112. For example, the primary computing system 104 can request tertiary data 108A indicating whether the user device 103 authenticated or allowed the unaffiliated computing system 102A to access the primary computing system 104 (e.g., to request payments or security information). The primary computing system 104 can send the request to the unaffiliated computing system 102A via the API.

At operation 724, the unaffiliated computing system 102A provides the tertiary data 108A to the primary computing system 104. The unaffiliated computing system 102A can receive the request for the tertiary data 108A and parse or analyze the request to identify the tertiary data 108A to be provided to the primary computing system 104. The unaffiliated computing system 102A can identify a subset of the tertiary data 108A in the database 106A of the unaffiliated computing system 102A. For example, the unaffiliated computing system 102A can identify the tertiary data 108A that indicates whether the user authenticated or allowed the unaffiliated computing system 102A to access the primary computing system 104 (e.g., to request payments or security tokens). The unaffiliated computing system 102A can send the tertiary data 108A to the primary computing system 104 via the API.

At operation 726, the primary computing system 104 can present the client application interfaces 126 in the client application 112 based on the tertiary data 108A. The primary computing system 104 can administer, maintain, or generate the client application interfaces 126. The client application interfaces 126 can include the tertiary data 110 and the primary data 124. In some implementations, the client application interfaces 126 can be based on subsets of the primary data 124 and the tertiary data 108A. The primary computing system 104 can generate the client application interfaces 126 for presentation in the client application 112. The primary computing system 104 can generate the client application interfaces 126 by analyzing, filtering, or processing the tertiary data 108 and/or the primary data 124. In some implementations, the primary computing system 104 can compare tertiary data 108A of the unaffiliated computing system 102A to the primary data 124 to generate the client application interfaces 126. For example, the tertiary data 108A can indicate scheduled or preconfigured access by the unaffiliated computing system 102A and the primary data 124 can be a log of access by the unaffiliated computing system 102A. The primary computing system 104 can compare the unaffiliated computing system 102A to the primary data 124 to determine whether the access was authorized and expected. The primary computing system 104 can generate the client application interfaces 126 based on the comparison.

The primary computing system 104 can provide or transmit the client application interfaces 126 to the client application 112. The client application 112 can present, display, or install client application interfaces 126 from the primary computing system 104. For example, the primary computing system 104 can cause the client application 112 to display that the unaffiliated computing system 102A is configured or scheduled to use or access (e.g., withdraw money or retrieve activities for analysis) an account administered by the primary computing system 104 for a user of the user device 103, without the user having to manually provide such information. The client application 112 can receive user inputs from users to interact with the client application interfaces 126.

At operation 728, the primary computing system 104 can receive a selection of the unaffiliated interface 110B. For example, the client application 112 can present the listing or bundle of the unaffiliated applications administered by respective unaffiliated computing systems 102. The client application 112 may display information about the unaffiliated interface 110B when available as a selection of an unaffiliated application to be integrated with the client application 112. For example, the client application 112 can display, autonomously or due to a prompt or instruction from the primary computing system 104, an image or description of the unaffiliated interface 110B. The client application 112 can identify functionalities of the unaffiliated interface 110B, such as automatic generation of forms.

The primary computing system 104 can detect or otherwise receive, from or via the client application 112, a selection of a unaffiliated interface 110B of the one or more unaffiliated interfaces 110 for integration with the client application 112. For example, a user can select the unaffiliated interface 110B via the client application 112 executing on the user device 103. In another example, selection of the unaffiliated interface 110B can cause the client application 112 to request, for example, an executable widget from the unaffiliated computing system 102B. The client application 112 can request the executable widget directly from the unaffiliated computing system 102B or via the primary computing system 104. Responsive to the request, the primary computing system 104 or the client application 112 can receive the executable widget. If the primary computing system 104 receives the widget, then the primary computing system 104 can provide or transmit the widget to the client application 112. The client application 112 can install or otherwise execute the widget to display the unaffiliated interface 110B of the unaffiliated computing system 102B.

In yet another example, selection of the unaffiliated interface 110B can cause the client application 112 to automatically select and request the unaffiliated interface 110A of the unaffiliated computing system 102A and the unaffiliated interface 110B of the unaffiliated computing system 102B. For example, the unaffiliated interface 110A of the unaffiliated computing system 102A and the unaffiliated interface 110B of the unaffiliated computing system 102B can be in a bundle. The primary computing system 104 can receive executable code from the unaffiliated computing system 102B that corresponds to the unaffiliated interface 110B of the unaffiliated computing system 102B for presentation via the client application 112. The client application 112 can execute the executable code to install, display, present, or initialize the unaffiliated interface 110B of the unaffiliated computing system 102B. For example, the primary computing system 104 can present the unaffiliated interface 110B of the unaffiliated computing system 110B via the client application 112 executing the executable code.

At operation 730, the primary computing system 104 can determine whether the unaffiliated computing system 102B that administers the selected unaffiliated interface 110B is linked with the primary computing system 104. For example, the primary computing system 104 can query an identifier of the unaffiliated computing system 102B in the database 122 to identify its linked status (e.g., linked or not linked). If the unaffiliated computing system 102B is not linked with the primary computing system 104, then the primary computing system 104 can initialize the same ("first API") or another API ("second API") at operation 732. If the unaffiliated computing system 102B is linked to the primary computing system 104, then the primary computing system 104 can verify whether sharing is permitted at operation 736.

At operation 732, the primary computing system 104 can initialize the first API or the second API with the unaffiliated computing system 102B to establish bidirectional communications. In some implementations, the primary computing system 104 can generate an API request identifying the client application 112 and the unaffiliated interface 110B. The API call can include an authentication token to authenticate the primary computing system 104 with the unaffiliated computing system 102B. In some implementations, the primary computing system 104 can transmit the API request via the first or second API to the unaffiliated computing system 102B administering the unaffiliated interface 110B.

At operation 734, the unaffiliated computing system 102B can establish the bidirectional link with the primary computing system 104. In some implementations, the unaffiliated computing system 102B can receive the API request from the primary computing system 104. The unaffiliated computing system 102B can identify the primary computing system 104 or the client application 112 based on the API request. The unaffiliated computing system 102B can approve the bidirectional link to provide the primary computing system 104 with tertiary data 108B or to receive the primary data 124 from the primary computing system 104. The unaffiliated computing system 102B can notify the primary computing system 104 that the bidirectional link is initialized or established. For example, the unaffiliated computing system 102B can transmit a response to the primary computing system 104.

At operation 736, the primary computing system 104 can determine whether the tertiary data 108A and the primary data 124 are permitted to be shared with the unaffiliated computing system 102B. The primary computing system 104 can query, in the database 122, rules or regulations that define sharing of the tertiary data 108A. For example, the unaffiliated computing system 102A can define whether the tertiary data 108A can be shared with the unaffiliated computing system 102B or unaffiliated computing systems in general. The primary computing system 104 can query rules or regulations in the database 122 regarding sharing of primary data 124. For example, a user of the primary computing system 104 can define whether the primary data 124 can be shared with the unaffiliated computing system 102B or unaffiliated computing systems in general. In another example, the client application 112 can receive settings from the user that specify which primary data 124 can be shared with the unaffiliated computing system 102B or unaffiliated computing systems in general. At operation 737, if data sharing is not permitted, the primary computing system 104, unaffiliated computing system 102B, and/or the client application 112 may request authorization to share account or user data (from, e.g., the user via the user device 103).

At operation 738, the primary computing system 104 can transmit the tertiary data 108A and the primary data 124 to the unaffiliated computing system 102B. The primary computing system 104 can identify a subset of the tertiary data 108A relating to the unaffiliated interface 110B administered by the unaffiliated computing system 102B. For example, the primary computing system 104 can determine that the identifier of the unaffiliated computing system 102A is relevant to the unaffiliated interface 110B that monitors access to the primary computing system 104 by the unaffiliated computing systems 102. The primary computing system 104 can transmit the subset of the tertiary data 108A via the API to the unaffiliated computing system 102B administering the unaffiliated interface 110B.

The primary computing system 104 can identify a subset of the primary data 124 relating to the unaffiliated interface 110B administered by the unaffiliated computing system 102B. For example, the primary computing system 104 can identify that the communication protocol configured between the unaffiliated computing system 102A and the primary computing system 104 is relevant to the unaffiliated interface 110B that monitors activities of the client application 112. In this example, the subset of the primary data 124 can indicate the communication protocols (e.g., data sharing) configured between the unaffiliated computing system 102A and the primary computing system 104. The primary computing system 104 can transmit the subset of the primary data 124 via the API to the unaffiliated computing system 102B administering the unaffiliated application that otherwise provides the unaffiliated interface 110B (or a version thereof).

At operation 740, the unaffiliated computing system 102B can provide unaffiliated interfaces 110 to the primary computing system 104. The unaffiliated computing system 102A can receive the subset of the tertiary data 108A and the primary data 124 from the primary computing system 104, and generate the unaffiliated interfaces 110. The unaffiliated computing system 102B can generate the unaffiliated interfaces 110 for display by the client application 112 executing on the user device 103. The unaffiliated computing system 102B can transmit the unaffiliated interfaces 110 to the primary computing system 104 via the API.

The unaffiliated computing system 102B can transform, analyze, organize, compare, or convert the subset of the tertiary data 108A and primary data 124 to generate the unaffiliated interfaces 110. For example, the unaffiliated computing system 102B can receive the identifier of the unaffiliated computing system 102A and the communication protocol configured between the unaffiliated computing system 102A and the primary computing system 104, and generate a unaffiliated interface 110 that indicates that the user is sharing data with the identified unaffiliated computing system 102A via the communication protocol.

In some implementations, the unaffiliated computing system 102B can compare the tertiary data 108A, the tertiary data 108B, and the primary data 124 to generate the unaffiliated interfaces 110. For example, the tertiary data 108B can define security configurations for the communication protocol identified by the primary data 124. The unaffiliated computing system 102B can generate an unaffiliated interface 110 that indicates that the user is sharing data with the identified unaffiliated computing system 102A via the communication protocol, and which security configurations are associated with the identified communication protocol.

At operation 742, the primary computing system 104 can present the unaffiliated interface 110B from the unaffiliated computing system 102B. The primary computing system 104 can receive the unaffiliated interface 110B from the unaffiliated computing system 102B via the API. The unaffiliated interface 110B can be based on the subset of the tertiary data 108A and the primary data 124 transmitted from the primary computing system 104 to the unaffiliated computing system 102B. In some implementations, the unaffiliated interface 110B can be based on the subset of the primary data 124, the tertiary data 108A, and the tertiary data 108B.

In some implementations, the unaffiliated interface 110B can be an updated unaffiliated application interface (used interchangeably with updated unaffiliated interface or updated interface) of a previously presented interface. For example, an initial unaffiliated interface 110B could have been based on just the primary data 124 and the tertiary data 108B. However, after the primary computing system 104 provided or transmitted the tertiary data 108A (e.g., additional information about the user), the unaffiliated computing system 102B can generate an updated interface for presentation in the client application. The updated interface can be based on (i) the primary data 124, (ii) the tertiary data 110B, and (iii) the tertiary data 110A.

The primary computing system 104 can provide the unaffiliated interfaces 110 to the client application 112 executing on the user device 103. The client application 112 can present or display the unaffiliated interfaces 110 from the unaffiliated computing systems 102. The primary computing system 104 can provide the unaffiliated interfaces 110 to the user device 103 for display by the client application 112. For example, the client application 112 can present the application interface that indicates data sharing with the identified unaffiliated computing system 102B via the communication protocol. The primary computing system 104 can cause display of the unaffiliated interfaces 110 without the user having to manually provide the primary data 124, the tertiary data 108A, and the tertiary data 108B.

Figure 8:
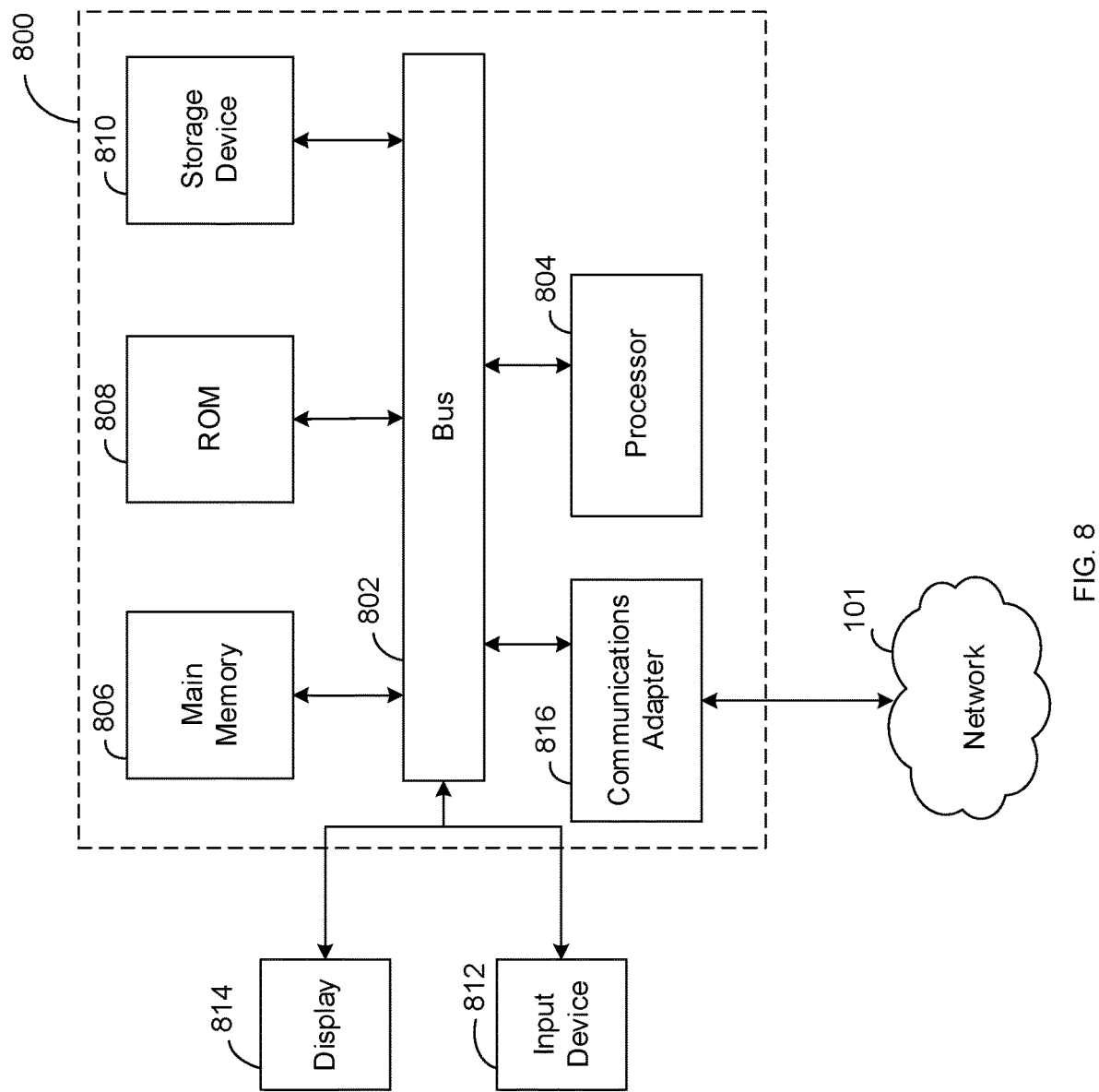
FIG. 8 is a component diagram of an example computing system suitable for use in the various arrangements described herein, according to various potential example implementations.

FIG. 8 is a component diagram of an example computing system suitable for use in the various implementations described herein, according to an example implementation. For example, the computing system 800 may implement an example unaffiliated computing system 102, user device 103, primary computing system 104, and/or various other example systems and devices described in the present disclosure.

The computing system 800 includes a bus 802 or other communication component for communicating information and a processor 804 coupled to the bus 802 for processing information. The computing system 800 also includes main memory 806, such as a random access memory (RAM) or other dynamic storage device, coupled to the bus 802 for storing information, and instructions to be executed by the processor 804. Main memory 806 can also be used for storing position information, temporary variables, or other intermediate information during execution of instructions by the processor 804. The computing system 800 may further include a read only memory (ROM) 808 or other static storage device coupled to the bus 802 for storing static information and instructions for the processor 804. A storage device 810, such as a solid state device, magnetic disk, or optical disk, is coupled to the bus 802 for persistently storing information and instructions.

The computing system 800 may be coupled via the bus 802 to a display 814, such as a liquid crystal display, or active matrix display, for displaying information to a user. An input device 812, such as a keyboard including alphanumeric and other keys, may be coupled to the bus 802 for communicating information, and command selections to the processor 804. In another implementation, the input device 812 has a touch screen display. The input device 812 can include any type of biometric sensor, a cursor control, such as a mouse, a trackball, or cursor direction keys, for communicating direction information and command selections to the processor 804 and for controlling cursor movement on the display 814.

In some implementations, the computing system 800 may include a communications adapter 816, such as a networking adapter. Communications adapter 816 may be coupled to bus 802 and may be configured to enable communications with a computing or communications network 101 and/or other computing systems. In various illustrative implementations, any type of networking configuration may be achieved using communications adapter 816, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes that effectuate illustrative implementations that are described herein can be achieved by the computing system 800 in response to the processor 804 executing an implementation of instructions contained in main memory 806. Such instructions can be read into main memory 806 from another computer-readable medium, such as the storage device 810. Execution of the implementation of instructions contained in main memory 806 causes the computing system 800 to perform the illustrative processes described herein. One or more processors in a multi-processing implementation may also be employed to execute the instructions contained in main memory 806. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor which, in some example implementations, may execute instructions stored, or otherwise accessed, via different areas of memory). Alternatively or additionally, the one or more processors may be structured to perform or otherwise execute certain operations independent of one or more co-processors. In other example implementations, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, and/or quad core processor), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A method comprising:
presenting, by a primary computing system, in a client application executing on a user device that provides access to a user account that is associated with a user and that comprises primary data corresponding to the user, a first graphical user interface comprising a listing of a plurality of unaffiliated applications administered by respective unaffiliated computing systems, each of the plurality of unaffiliated applications corresponding to a respective application programming interface (API);
receiving, by the primary computing system, based on a first interaction with the first graphical user interface presented via the client application, a request to integrate an unaffiliated application of the listing of the plurality of unaffiliated applications with the client application;
responsive to the request to integrate the unaffiliated application with the client application, establishing, by the primary computing system, a bidirectional communication link with an unaffiliated computing system that is associated with the unaffiliated application using the respective API;
identifying, by the primary computing system, using the bidirectional communication link, a subset of the primary data that relates to the unaffiliated application based on functionality provided by the unaffiliated application;
determining, by the primary computing system, that the subset of the primary data is not authorized to be shared with the unaffiliated computing system associated with the unaffiliated application;
responsive to determining that the subset of the primary data is not authorized to be shared with the unaffiliated computing system, requesting, by the primary computing system, authorization from the client application executing on the user device to share the subset of the primary data with the unaffiliated computing system;
responsive to receiving the authorization, updating, by the primary computing system, permission settings that authorize transmission of the subset of the primary data to the unaffiliated computing system;

transmitting, by the primary computing system using the bidirectional communication link, according to the permission settings, the subset of the primary data;

receiving, by the primary computing system, from the unaffiliated computing system via the bidirectional communication link, executable code corresponding to an unaffiliated application interface that is generated based on the subset of the primary data, the executable code provided to present the unaffiliated application interface via the client application; and presenting, by the primary computing system, the unaffiliated application interface in a second graphical user interface of the client application by providing the executable code to the client application, wherein the client application presents the unaffiliated application interface without requiring the user to provide the subset of the primary data to the unaffiliated application.

2. The method of claim 1, wherein presenting the unaffiliated application interface comprises transmitting the executable code to the client application executing on the user device for execution in presenting the unaffiliated application interface, wherein the unaffiliated application interface provides interactivity with the primary data and/or data based on an analysis or a processing of the primary data.

3. The method of claim 1, further comprising:
generating, by the primary computing system, an API request identifying the client application and the unaffiliated application; and
transmitting, by the primary computing system, the API request via the respective API to the unaffiliated computing system corresponding to the unaffiliated application.

4. The method of claim 1, wherein the unaffiliated application is a first unaffiliated application, and wherein the request is a first request, the method further comprising receiving, by the primary computing system, via the client application, a second request to integrate a second unaffiliated application with the client application.

5. The method of claim 1, further comprising receiving, by the primary computing system, from the unaffiliated computing system via the respective API, tertiary data relating to the user account or to the user associated with the user account.

6. The method of claim 5, wherein the unaffiliated application is a first unaffiliated application, wherein the unaffiliated computing system is a first unaffiliated computing system, wherein the respective API is a first API, and wherein the subset of the primary data is a first subset of the primary data, the method further comprising:
identifying, by the primary computing system, a second subset of the primary data related to a second unaffiliated application; and
transmitting, by the primary computing system via a second API, the second subset of the primary data and the tertiary data to a second unaffiliated computing system corresponding to the second unaffiliated application.

7. The method of claim 6, wherein the unaffiliated application interface is a first unaffiliated application interface, the method further comprising:
receiving, by the primary computing system, a second unaffiliated application interface that is based on the second subset of the primary data and the tertiary data; and
presenting, by the primary computing system, via the client application, the second unaffiliated application interface, wherein the client application presents the second unaffiliated application interface without requiring the user to provide the second subset of the primary data or the tertiary data to the second unaffiliated application.

8. The method of claim 7, wherein the tertiary data is a first set of tertiary data, the method further comprising:
receiving, by the primary computing system, from the second unaffiliated computing system via the second API, a second set of tertiary data related to the at least one of the user account, the user, or the first set of tertiary data; and
transmitting, by the primary computing system via the second API, the second set of tertiary data to the first unaffiliated computing system.

9. The method of claim 8, further comprising receiving, by the primary computing system from the first unaffiliated computing system, an updated application interface for presentation in the client application, the updated application interface being based on (i) the first subset of the primary data, (ii) the first set of tertiary data, and (iii) the second set of tertiary data, wherein the client application presents the updated application interface without requiring the user to provide, to the first unaffiliated computing system or to the first unaffiliated application, (i) the first subset of the primary data, (ii) the first set of tertiary data, and (iii) the second set of tertiary data.

10. A system comprising one or more processors coupled to memory, the one or more processors configured to:
present, in a client application executing on a user device that provides access to a user account that is associated with a user and that comprises primary data corresponding to the user, a first graphical user interface comprising a listing of a plurality of unaffiliated applications administered by respective unaffiliated computing systems, each of the plurality of unaffiliated applications corresponding to a respective application programming interface (API);
receive, based on a first interaction with the first graphical user interface presented via the client application, a request to integrate an unaffiliated application of the listing of the plurality of unaffiliated applications with the client application;
responsive to the request to integrate the unaffiliated application with the client application, establish a bidirectional communication link with an unaffiliated computing system that is associated with the unaffiliated application using the respective API;
identify, using the bidirectional communication link, a subset of the primary data that relates to the unaffiliated application based on functionality provided by the unaffiliated application;
determine that the subset of the primary data is not authorized to be shared with the unaffiliated computing system associated with the unaffiliated application;
responsive to determining that the subset of the primary data is not authorized to be shared with the unaffiliated computing system, request authorization from the client application executing on the user device to share the subset of the primary data with the unaffiliated computing system;
responsive to receiving the authorization, update permission settings that authorize transmission of the subset of the primary data to the unaffiliated computing system;
transmit, using the bidirectional communication link, the subset of the primary data;
receive, from the unaffiliated computing system via the bidirectional communication link, executable code corresponding to an unaffiliated application interface that is generated based on the subset of the primary data, the executable code provided to present the unaffiliated application interface via the client application; and present the unaffiliated application interface in a second graphical user interface of the client application by providing the executable code to the client application, wherein the client application presents the unaffiliated application interface without requiring the user to provide the subset of the primary data to the unaffiliated application.

11. The system of claim 10, wherein presenting the unaffiliated application interface comprises transmitting the executable code to the client application executing on the user device for execution in presenting the unaffiliated application interface, wherein the unaffiliated application interface provides interactivity with the primary data and/or data based on an analysis or a processing of the primary data.

12. The system of claim 10, wherein the one or more processors are further configured to:
generate an API request identifying the client application and the unaffiliated application; and
transmit the API request via the respective API to the unaffiliated computing system corresponding to the unaffiliated application.

13. The system of claim 12, wherein the unaffiliated application is a first unaffiliated application, wherein the request is a first request, and wherein the one or more processors are further configured to receive, via the client application, a second request to integrate a second unaffiliated application with the client application.

14. The system of claim 10, wherein the one or more processors are further configured to receive, from the unaffiliated computing system via the respective API, tertiary data relating to the user account or to the user associated with the user account.

15. The system of claim 14, wherein the unaffiliated application is a first unaffiliated application, wherein the unaffiliated computing system is a first unaffiliated computing system, wherein the respective API is a first API, and wherein the subset of the primary data is a first subset of the primary data, and wherein the one or more processors are further configured to:
identify a second subset of the primary data related to a second unaffiliated application; and
transmit, via a second API, the second subset of the primary data and the tertiary data to a second unaffiliated computing system corresponding to the second unaffiliated application.

16. The system of claim 15, wherein the one or more processors are further configured to:
receive, a second unaffiliated application interface that is based on the second subset of the primary data and the tertiary data; and
present, via the client application, the second unaffiliated application interface, wherein the client application presents the second unaffiliated application interface without requiring the user to provide the second subset of the primary data or the tertiary data to the second unaffiliated application interface.

17. The system of claim 16, wherein the tertiary data is a first set of tertiary data and wherein the one or more processors are further configured to:
receive, from the second unaffiliated computing system via the second API, a second set of tertiary data related to at least one of the user account, the user, or the first set of tertiary data; and
transmit, via the second API, the second set of tertiary data to the first unaffiliated computing system.

18. The system of claim 17, wherein the one or more processors are further configured to receive, from the first unaffiliated computing system, an updated application interface for presentation in the client application, the updated application interface being based on (i) the first subset of the primary data, (ii) the first set of tertiary data, and (iii) the second set of tertiary data, wherein the client application presents the updated application interface without requiring the user to provide, to the first unaffiliated computing system or to the first unaffiliated application, (i) the first subset of the primary data, (ii) the first set of tertiary data, and (iii) the second set of tertiary data.

* * * * *